United States Patent [19]

Layton et al.

[11] Patent Number: 5,296,542

[45] Date of Patent: Mar. 22, 1994

[54] HEAT RESISTANT POLYMERS AND BLENDS OF HYDROQUINONE POLY (ISOTEREPHTHALATES) CONTAINING RESIDUES OF P-HYDROXYBENZOIC ACID

[75] Inventors: Richard Layton, Augusta, Ga.; James W. Cleary, Neenah, Wis.; Paul J. Huspeni, North Augusta, S.C.; Paul D. Frayer, Martinez, Ga.; Markus Matzner, Edison, N.J.

[73] Assignee: Amoco Corporation, Chicago, Ill.

[21] Appl. No.: 790,663

[22] Filed: Nov. 8, 1991

Related U.S. Application Data

[60] Division of Ser. No. 499,482, Jun. 4, 1990, Pat. No. 5,079,289, which is a continuation-in-part of Ser. No. 255,670, Oct. 11, 1988, abandoned, and a continuation-in-part of Ser. No. 255,632, Oct. 11, 1988, abandoned.

[51] Int. Cl.$^5$ ...................... C08F 20/00; C08G 63/00; C08G 63/02
[52] U.S. Cl. .................................. 524/600; 524/601; 524/604; 524/605; 525/444; 528/176; 528/179; 528/180; 528/193
[58] Field of Search ............... 524/600, 601, 604, 605; 525/444; 528/176, 179, 180, 193

[56] References Cited

U.S. PATENT DOCUMENTS

| | | | |
|---|---|---|---|
| 3,306,875 | 2/1967 | Hay | 521/216 |
| 4,585,823 | 4/1986 | Saito et al. | 524/456 |
| 4,626,557 | 12/1986 | Duska et al. | 523/100 |
| 4,742,149 | 5/1988 | Finestone | 528/179 |

OTHER PUBLICATIONS

"The Chemistry of Cellulose and Wood" *Aca. of Sci. USSR.*, Nikitin, pp. 62-71 (1966).

*Primary Examiner*—John Kight, III
*Assistant Examiner*—T. Mosley
*Attorney, Agent, or Firm*—Matthew R. Hooper; Stephen L. Hensley; Frank J. Sroka

[57] ABSTRACT

This invention pertains to novel copolyesters consisting essentially of units (I), (II), (III), and (IV).

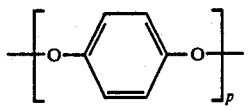

(I)

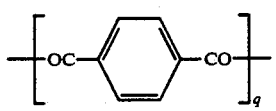

(II)

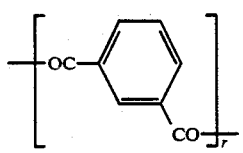

(III)

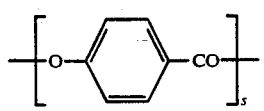

(IV)

and blends of these polymers and articles made from both. Units (I), (II), (III), and (IV) are present in specified proportions as defined in the "Description of the Invention."

The instant copolyesters display orientation in the molten state, good fiber ratings and high strength; they have melting points in the range of from about 340° to about 400° C. and are melt-processible. Advantageously, these compositions filled with about 30 weight percent of glass fibers display heat distortion temperatures of over 240° C. up to about 280° C. and higher, when measured under a load of 264 psi. When blended, certain properties are improved, particularly they are easier to melt fabricate, have a decreased tendency to blister and increased strength. These polymers and blends may be used advantageously in ovenware, electronic components, electrical equipment, and other end uses requiring high temperatures.

34 Claims, No Drawings

HEAT RESISTANT POLYMERS AND BLENDS OF HYDROQUINONE POLY (ISOTEREPHTHALATES) CONTAINING RESIDUES OF P-HYDROXYBENZOIC ACID

This is a division of application Ser. No. 07/499,482, now U.S. Pat. No. 5,079,289, filed Jun. 4, 1990 which in turn is a continuation-in-part of Ser. No. 255,670, filed Oct. 11, 1988, now abandoned, and a continuation-in-part of Ser. No. 255,632 filed Oct. 11, 1988, now abandoned.

FIELD OF THE INVENTION

This invention pertains to novel copolyesters consisting essentially of units (I), (II), (III), and (IV).

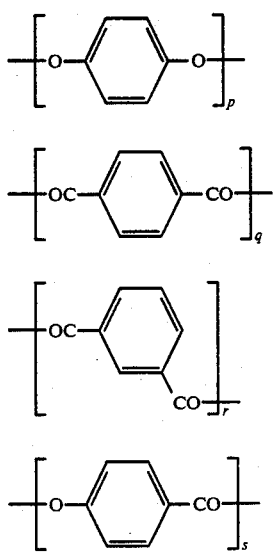

and blends of these polymers and articles made from both. Units (I), (II), (III), and (IV) are present in specified proportions as defined in the "Description of the Invention."

The instant copolyesters display orientation in the molten state, good fiber ratings and high strength; they have melting points in the range of from about 340° to about 400° C. and are melt-processible. Advantageously, these compositions filled with about 30 weight percent of glass fibers display heat distortion temperatures of over 240° C. up to about 280° C. and higher, when measured under a load of 264 psi. When blended, certain properties are improved, particularly they are easier to melt fabricate, have a decrease tendency to blister and increased strength. These polymers and blends may be used advantageously in ovenware, electronic components, electrical equipment, and other end uses requiring high temperatures.

BACKGROUND OF THE INVENTION

Wholly aromatic polyester resins have long been known. For instance, 4-hydroxybenzoic acid homopolymer and copolymers have been described in the part and are commercially available. Such polymers commonly are crystalline in nature and, when molten, frequency exhibit orientation in the melt; however, they have relatively high melting points or possess a decomposition temperature which is below the melting point, which leads to great difficulty in processing.

The homopolymer of p-hydroxybenzoic acid is a very high melting, insoluble material and, hence, very difficult to fabricate. Melting points as high as 610° C. were quoted—see W. J. Jackson, The British Polymer Journal, December 1980, p. 155. In order to depress the high melting point of homopolymer so as to make it melt fabricable, a variety of materials incorporating different types of comonomers were prepared over the years.

One such material is, for example, the resin made from p-hydroxybenzoic acid, isophthalic and/or terephthalic acids and 4,4'-biphenol as described in Cottis et al., U.S. Pat. Nos. 3,637,595 and 3,975,487. The polymer as outstanding high temperature properties and can be molded to give articles of high modulus and strength. It is offered commercially by Amoco Performance Products, Inc. under the trademark of Xydar ®.

The main drawback of the prior art p-hydroxybenzoic acid copolymers is the relatively high cost associated with the use of an expensive comonomer, such as 4,4'-biphenol, substituted hydroquinones (e.g., phenylhydroquinone), naphthalene diols, naphthalene dicarboxylic acids, and hydroxy-naphthoic acids. Efforts to replace these expensive monomers with the significantly less expensive hydroquinone, which is disclosed as an equivalent of biphenol in the aforementioned U.S. Pat. Nos. 3,637,595 and 3,975,487, were made by several research groups; however, none of these investigations were successful.

Study of the prior art shows that replacement of 4,4'-biphenol with hydroquinone leads to materials with inferior properties. The problem created by the introduction of hydroquinone is basically the following: at high terephthalate contents, high melting generally intractable polymers are obtained; tractability may be achieved at higher isophthalate levels, but the polyesters are relatively low melting and often display low second order glass transition temperatures which lead to low moduli and low heat distortion temperatures. For example, polyesters from p-hydroxybenzoic acid (PHBA) isophthalic acid (IA) and hydroquinone (HQ) were prepared by Deex, U.S. Pat. No. 4,377,681. At mole ratios PHBA/IA/HQ of 33.3/33.3/33.3 the material had a glass transition temperature of 110° C.; when the above coreactants were used at ratios of 50/25/25, a Tg of 115° C. was obtained.

The high melting points of a series of p-hydroxybenzoic acid/terephthalic acid/hydroquinone copolymers are graphically illustrated in FIG. 2 of the paper by G. W. Calundann, *Industrial Development of Thermotropic Polyesters* in High Performance Polymers: Their Origin and Development 235-249 (R. B. Seymour and G. S. Kirshenbaum, editors 1986). The publication shows clearly (in FIG. 2) that hydroquinone polymers melt at considerably higher temperatures than their 4,4'-biphenol counterparts. The $T_m$ of the lowest melting composition shown is about 420° C. FIG. 4 of the same publication (p. 243) indicates how one research group was able to depress the melting points of the subject polymers by incorporating naphthalene diols, naphthalene dicarboxylic acids, and hydroxy naphthoic acids into them. From a purely technical point of view, the latter approach was a success; however, the modified polymers were still expensive due to the high cost of the naphthalene-based monomers.

The intractability of the hydroquinone-derived materials is discussed in Jackson et al., U.S. Pat. No. 4,242,496. Column 2, lines 18-26, states:

"U.S. Pat. No. 3,637,595 discloses that aromatic liquid crystal polyesters prepared from terephthalic acid, hydroquinone and varying amounts of p-hydroxybenzoic acid melt in the general range of 800° to 900° F. Obviously, the melting point of these polymers is far too high and the thermal stability is insufficient to permit these polymers to be used in conventional melt-processing equipment."

It is further stated (column 2, lines 33-40) that a solution to the above problem "was to incorporate a substituent on some of the aromatic rings of the polyester, preferably on the diol ring. For example, it is well known that use of chloro, methyl or ethyl hydroquinone lowers the melting point of the polyester. Although this approach can be used to lower the melting point, typically the mechanical properties are also substantially reduced."

The patent goes on to propose the use of phenyl hydroquinone (an expensive comonomer) as the best way whereby the melting point can be reduced to obtain tractable resins, without adversely affecting the mechanical properties. As indicated earlier, polyesters forming oriented melts were made from a variety of substituted hydroquinones. See, for example, Lee et al., U.S. Pat. No. 4,600,765; Hutchings et al., U.S. Pat. Nos. 4,614,790 and 4,614,791; and Funakoshi et al., U.S. Pat. No. 4,447,593. Readily processible polyesters made from p-hydroxybenzoic acid, isophthalic and optionally terephthalic acid, hydroquinone and 3,4'- and/or 4,4'-biphenol, 3,4'- and/or 4,4'-dihydroxydiphenyl ether, 3,4'- and/or 4,4'-dihydroxydiphenyl sulfide are the subject of Dicke et al., U.S. Pat. No. 4,603,190. It should be recognized that once again an expensive monomer is necessary to obtain tractable melts. Similar situations are encountered in a host of other U.S. and foreign patents. See, for example: Portugall et al., European Patent Appln. No. EP-257,558; Hisgen et al., European Patent Appln. No. EP-257,598; Hisgen et al., German Patent Appln. No. DE-3,629,208; Hisgen et al., German Patent Appln. No. DE-3,629,210; and Okamoto et al., World Patent Application No. WO-88/00,955.

As pointed out above, tractable materials result at high isophthalic acid levels but the products typically display undesirably low glass transition temperatures. Deex, U.S. Pat. No. 4,377,681 states (column 1, lines 31-38):

"For example, liquid crystal copolyesters have been prepared from the following fairly rigid molecular species: p-hydroxybenzoic acid, hydroquinone and isophthalic acid. However, when ratios of the monomers are selected to provide tractable polymers, the glass transition temperature is generally low and the high temperature mechanical properties are reduced."

Attempts to increase the Tg of these products have been made. Thus, Deex, U.S. Pat. No. 4,377,681, claims copolyesters prepared from p-hydroxybenzoic acid, isophthalic acid, hydroquinone and 2,2-bis(4-hydroxyphenyl) propane. The preferred compositions contain from about 20 to about 35 mole percent of p-hydroxybenzoic acid units, and from about 5 to about 12 mole percent of 2,2-bis(4-hydroxy phenyl)propane (bisphenol-A) based on the total diphenol components. Glass transition temperatures of about 175° to about 190° C. were observed in these polymers. These values represent an improvement when compared to the Tg's of the polyesters mentioned supra. However, they must be considered low as they lead to heat distortion temperatures (HDT's) which are, at best, of the order of about 120° to 140° C.; moreover, the introduction of bisphenol-A lowers the degree of crystallinity and the rate of crystallization which we believe, as will be discussed infra, leads to lower HDT's. In addition, mold shrinkage of these copolymers is unsatisfactorily high.

Park U.S. Pat. No. 4,816,552 is directed to polymers prepared by heating a mixture of a 4-acetoxybenzoic acid derivative, a hydroquinone diacetate derivative, a dicarboxylic acid, and a 4-acetoxy-(4-acetoxyphenyl) benzoate derivative in two steps to remove generated acetic acid and form the polymer.

This patent is directed specifically to block copolymers with a specific sequence of recurring units. It reportedly has improved spinning processability. Our present invention is produced in a manner well known in the art to produce a random copolymer. As shall be shown infra, our invention is produced by the acidolysis method as disclosed in U.S. Pat. No. 3,637,595 which Park acknowledges produces a "partial block," i.e., a random copolymer. Park further states that polymers made by that method have no practical use due to high melting point, high viscosity, and inferior processability (U.S. Pat. No. 4,816,552 col. 2, 1. 15-32).

The dilemma facing those who have attempted the development of tractable, high HDT, hydroquinone-/benzene dicarboxylic acid/p-hydroxybenzoic acid copolyesters is perhaps best illustrated by Example 1 of Cottis et al., U.S. Pat. No. 3,975,487. A polyester having excellent properties, based upon a 1:3 molar ratio of isophthalic:terephthalic acids, p-hydroxybenzoic acid, and 4,4'-biphenol was prepared. When this example was repeated using hydroquinone in place of biphenol and all isophthalic acid as the dicarboxylic acid, a polymer having poorer properties (i.e., a lower flexural strength and a lower modulus) was obtained (column 10, lines 60-63).

Copolyesters based on p-hydroxybenzoic acid (PHBA), hydroquinone (HQ), isophthalic (IA) and terephthalic (TA) acids are disclosed in Cottis et al., U.S. Pat. No. 3,637,595. Cottis shows one example in which a resin incorporating all of the four monomers is described (Example 10). The polymer was formed from 1.0 mole of PHBA, 0.5 moles of IA, 0.5 moles of TA, and 1.0 moles of HQ. It was poorly characterized; weight loss in air, at 752° F. was apparently high, indicating thermal stability problems. Our own characterization of the resin produced by the preferred process utilized in this invention (see Experimental, Comparative Example 2 also designated as X) showed that it possessed a low HDT (214° C.)).

Thus, the elusive goal of developing a low cost hydroquinone-based crystalline polymer which when filled with 30 percent by weight of glass fibers (1) has an HDT of at least 240° C. and preferably 280° C. and higher, (2) is melt-processible below the decomposition temperature of about 415° C., (3) has a melting point in the range of 340° to 400° C., a crystallization temperature of 300° to 340° C. and a crystallization rate of at least 1,000 counts per minute, has not been achieved in the prior art. In fact, based on the prior art, it appears unlikely that polymers having these properties can be produced, particularly polymers consisting essentially of units (I), (II), (III), and (IV). Furthermore, even though the overall combination of properties of the neat unblended polymers is outstanding, they may form molded parts that show undesirable blistering (i.e., raised areas).

It has now been discovered that the addition of a first polyester polymer (a) comprising recurring moieties of dihydroxyarylene comprising hydroquinone, a nonvicinal benzene dicarboxylate (preferably terephthalic acid and mixtures of terephthalic acid and isophthalic acid) and p-oxybenzoate to a second polyester polymer (b) comprising recurring moieties of naphthalene based monomers and/or diphenol, nonvicinal benzene dicarboxylate and p-oxybenzoate, wherein said polymers and the moieties making up the polymers are present in specified proportions, yields alloys in which the tendency to blister is substantially reduced or eliminated and also having increased strength and good fabricability.

The preferred mole ratios of monomers of the base polyester are depicted in the triangular diagrams and are described infra. The polymers melt in the range of from about 300° to about 420° C., preferably 340°–400° C. Of particular interest are the polyesters falling into area A of FIG. 1.

With some known exceptions, mixtures of polymeric materials are generally immiscible. That is, they consist of domains of chemically distinct phases. Usually, one component forms a continuous phase, while the other component forms roughly spherical domains as inclusions. Under some circumstances, bi-continuous structures are also obtainable. Mixing two arbitrarily chosen polymers usually results in inferior materials having no utility, since in the absence of adhesion between phases, the dispersed phase merely weakens the continuous phase. Some polymeric products, such as the wholly aromatic polyesters, exhibit an ordered structure in at least some regions of the polymer. This order can exist in one, two or three dimensions. The incorporation into blends of polymers exhibiting an ordered structure leads to an increased tendency of the blends to separate into phases. This is believed to be due to the fact that the order found in certain regions of the resin causes a fairly sharp boundary between the domains of the molecules of the component polymers. Hence, blends including such polymers would be expected to exhibit a significant reduction in properties.

It should be noted, however, that many useful blends whose morphology and phase interaction are favorable, are known.

Cottis, U.S. Pat. No. 4,563,508, is directed to the improvement of molding compounds based on wholly aromatic polyesters by the addition of a minor amount of a flow modifier. The flow modifier crystallizes poorly and improves the flow of the highly crystallized base polymer it is added to. The flow modifier does not enhance the end properties of the blend composition. It is to be noted that the addition of the flow modifier decreases the HDT of the composition and does not increase the strength.

Takayanagi et al., U.S. Pat. No. 4,228,218, discloses a polymer composition comprising 20 percent or less, based upon the total weight of polymeric material, of a first rigid polymer with the balance being a second polymer composed substantially of flexible molecular chains. The first polymeric material is dispersed in the second polymeric material in a microscopic region of 1 μm or less. It is believed that wholly aromatic polyesters would be characterized by those skilled in the art as a rigid molecules within the context of the above cited patent. The patent does not disclose blends of two or more polymers having rigid chains with improved blister resistance as does the present invention.

Blends of polymers exhibiting orientation in the melt with other polymers were investigated. Mixtures of liquid crystalline polyesters with poly(alkylene terephthalates), polycarbonates and polyarylates were described in Cincotta et al., U.S. Pat. Nos. 4,408,022 and 4,451,611; Froix, U.S. Pat. Nos. 4,489,190 and 4,460,735; and in Kiss, European Patent Application No. 169,947. Improved mechanical properties were found with these materials. The addition of a particular liquid crystal polymer to poly(butylene terephthalate) or other thermoplastic polymers was described as a method to obtain compositions with enhanced resistance to melt dripping during burning (see Kim et al., U.S. Pat. No. 4,439,578). In several instances, e.g., in alloys of liquid crystalline polyesters with an aromatic sulfone polymer (Froix et al., U.S. Pat. No. 4,460,736) with an aromatic poly(ester amide) (Kiss, U.S. Pat. No. 4,567,227), and with poly(arylene sulfides) (Froix, U.S. Pat. No. 4,276,397) improved mechanical characteristics and improved processability (lower viscosity) of the non-anisotropic resin were noted. Better properties were also obtained by blending two particular liquid crystalline polyesters (see, for example, Froix, U.S. Pat. No. 4,267,289).

Liquid crystalline materials, including polyesters, were used to decrease the viscosity and improve the processability of a number of other resins, including fluorinated polyolefins (see Bailey et al., U.S. Pat. No. 4,417,020; Cogswell et al., U.S. Pat. Nos. 4,429,078 and 4,438,236; and George et al., U.S. Pat. No. 4,650,836).

In one instance (Bailey et al., U.S. Pat. No. 4,508,891), it was claimed that the addition of an isotropic resin to an anisotropic resin leads to a decrease of anisotropy in the corresponding molded articles.

The fracture-surface morphology of thermotropic 6-hydroxy-2-naphthoic acid-p-hydroxybenzoic acid copolymer blends with nylon 6, poly(butylene terephthalate), and polycarbonate prepared by screw injection molding, was studied by Beery et al. *J. Mater. Sci. Lett.* 1988, 7(10), pp. 1071-3. The morphology was found to be strongly dependent on the flow history and on the composition of the subject mixtures.

A commonly assigned patent application entitled "Extrusion-Grade Compositions Comprising Mixtures of Wholly Aromatic Polyesters," Ser. No. 060,038, filed on Jun. 9, 1987, in the names of Field et al., now U.S. Pat. No. 4,851,480, hereby incorporated by reference, describes alloys of a first polyester comprising recurring moieties of 4,4'-biphenol, terephthalate, and p-oxybenzoate; with a second polyester comprising the same recurring moieties, but wherein the proportion of the p-oxybenzoate units is higher than in the first polyester. The application discloses that while each individual polyester is difficult to extrude into acceptable products, their alloys provide good extrusion grade compositions. Molding compositions comprised of the above first and second polyester, filler, and optionally a polymeric flow modifier are claimed in commonly assigned U.S. patent application entitled "Molding Compositions Comprising Mixtures of Wholly Aromatic Polyesters and Fillers," Ser. No. 060,114 filed on Jun. 9, 1987 in the name of J. J. Duska, hereby incorporated by reference.

Thus, it is known from the prior art that it is possible to alloy two polyesters, wherein said polyesters are based on identical monomers but differ in the relative proportion of the monomers, wherein each of said polyesters has unsatisfactory molding and extrusion characteristics and obtain good molding and extrusion grade compositions.

No reference is known which is directed to the improvement of surface properties (i.e., blistering) by blending two polymers having orientation in the melt. A feature of the instant invention that is totally unexpected and highly remarkable is the fact that compatible blends showing good mechanical and surface properties are achieved by alloying two crystalline wholly aromatic copolyesters prepared from monomers having totally different structures, e.g., phenylene versus naphthalene or biphenylene. The enhanced blister resistance is particularly astonishing. Indeed, while the blister phenomenon is not fully understood, it has been attributed to non-homogeneity in random copolymers. It any event, as indicated earlier, alloys of materials having ordered structures would be expected to have reduced properties. Hence, the instant discovery was highly surprising and totally unexpected.

It is the general object of the present invention to provide novel, inexpensive, melt-processible hydroquinone poly(iso-terephthalates) containing residues of p-hydroxybenzoic acid polymers which form a highly tractable oriented melt phase, and which are capable of melt extrusion to form quality, high performance fibers, films, three-dimensional molded articles, etc. The polymers display high HDT's which are essential in certain high heat applications. They have good flexural strength and produce good fibers. When blended with other polymers they produce inexpensive high heat polymers capable of high HDT's and still produce an attractive blister-resistant surface.

It is a further object of the present invention to provide novel, melt-processible hydroquinone poly(iso-terephthalates) containing residues of p-hydroxybenzoic acid, polymers which form a melt phase below 400° C. in the substantial absence of polymer degradation, unlike many other polymers which include relatively high concentrations of the 4-oxybenzoyl moiety.

These and other objects, as well as the scope, nature and utilization of the invention will be apparent to those skilled in the art from the following detailed description.

The Invention

It was unexpectedly discovered that copolyesters, consisting essentially of units (I), (II), (III), and (IV)

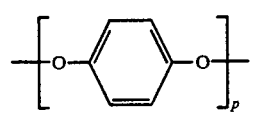

(I)

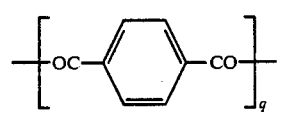

(II)

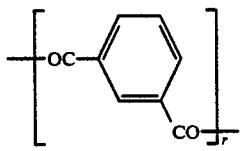

(III)

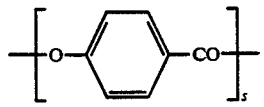

(IV)

where p is approximately equal to q+r; the values of p, q, r and s are as hereinbelow defined; and having molecular weights in the range of from about 2,000 to about 200,000, display an outstanding combination of properties. The subject polymers form a stable oriented melt phase at 340° to 400° C., preferably from 340° to 380° C.; the melt phase is tractable and can be melt-extruded below its decomposition temperature to form quality, high performance fibers, films, molded articles, and the like. Fabricated products show high strength as well as good retention of properties at high temperatures. Advantageously, materials filled with 30 percent by weight of glass have heat distortion temperatures of over 240° to about 280° C. and higher, under a load of 264 psi. It is believed that the higher the amount of crystallinity of the polymer the higher the heat distortion temperature (HDT) will be. The crystallization temperatures of the subject copolymers are in the range of from 300° to 340° C., preferably from 310° to 340° C.; and their crystallization rates are at least 1,000 and up to 3,500 counts per minute, preferably from 1,500 to 2,000 counts per minute.

Some of the preferred novel copolymer compositions which combine the above-mentioned outstanding properties are plotted in the triangular phase diagram FIG. I. The diagram shows the compositional area of interest, area A. The coordinates for each point of this area define a copolyester in terms of percentages of p-oxybenzoyl, hydroquinone terephthaloyl and hydroquinone isophthaloyl units. Percentages for graph purposes of p, q, r and s can be calculated from the molar compositions by assuming p is constant at 1.0 mole and by adding the total moles of q/r/s as the denominator and dividing that into the moles of each monomer, thereby calculating the percentage of each constituent. For example, if the molar concentration of q/r/s/p, respectively, are: 0.5/0.5/0.25/1.0, the percentages are $$\underset{q}{\frac{0.50}{1.25}} + \underset{r}{\frac{0.50}{1.25}} + \underset{s}{\frac{0.25}{1.25}} = 100\%$$

As indicated above, the properties of the polymer are somewhat dependent on the method of synthesis. It should be noted that the criterion for borderline compositions on the phase diagram is that the HDT as measured on 30 percent glass-filled products under a load of 264 psi is about 240° to about 280° C. and higher. Accordingly, those polymers which are melt-processible and which yield HDT's of from about 240° C. to about 280° C. are considered as falling within the scope of the instant invention.

It is important to point out that melting points, HDT's, crystallization temperatures and crystallization rates are basic property parameters that determine polymer performance. Thus, a very high melting point above 400° C. results in materials that are either difficult to melt-fabricate or plain intractable (vide supra). Lower melting points lead to resins having lower HDT's. High heat distortion temperatures are very important in certain applications since they indicate the upper temperature at which the particular polymer is useful, especially in structural applications.

As indicated earlier, two additional useful characteristics of the instant copolyesters are their crystallization temperature and crystallization rate. By crystallization temperature is meant the temperature at which onset of crystallization takes place; it is generally in the range of from 300° to 340° C. preferably from 310° to 340° C. The crystallization rate is expressed as an increase in counts per minute as measured by X-ray techniques (see below); this increase is of the order of at least 1,000 to 3,500 counts per minute, preferably of from 1,500 to 2,000 counts per minute. Crystallization temperatures and rates of crystallization are related to the degree of crystallinity of the material. If these two parameters are low, the high temperature characteristics of the polyester develop slowly. On the other hand, if the above two parameters are too high, standard molding of the polymer becomes difficult and more severe fabrication conditions (e.g., higher temperatures), or techniques such as compression molding, impact molding or plasma spraying have to be utilized.

Melting points, crystallization temperatures and rates of crystallization were determined using X-ray techniques. A brief description of these techniques follows.

The crystalline melting point is measured by following the intensity of the X-ray diffraction of the most intensive peak as a function of temperature. The most intensive diffraction peak is located at a spacing of about 4.5 Å. Based on literature data [J. Polymer Sci., Polym. Chem. Ed., 14, 2207 (1976); J. Polymer Sci., Polym. Chem. Ed., 21, 2249 (1983)], the subject peak has been tentatively assigned to the distance between the polymer chains. The point at which the intensity reaches a minimum is considered for the polymer melt temperature. The rate of temperature change is 100° C. per minute.

The onset of crystallization is taken as the temperature at which there is a sharp increase in the intensity of the X-ray peak referred to above. Again, the rate of cooling is 100° C. per minute.

Crystallization rate is defined as the difference between the intensities of the above X-ray peak at the crystallization temperature and at 40° C. below that temperature, the rate of cooling being 100° C. per minute.

A detailed description of the three methods is given in the Experimental. Note that throughout this patent, all melting and crystallization data refer to the second heating/cooling cycle of the sample (see Experimental).

It is important to note that the instant invention does not reside in the use of novel monomers; the critical factor of the present invention is the discovery that polymers having the particular combination of physical properties can be obtained when the four monomers, i.e., p-hydroxybenzoic acid (PHBA), hydroquinone (HQ), isophthalic acid (IA) and terephthalic acid (TA), are used in certain amounts and are produced by the preferred method.

The metes and bounds of the present invention have been defined by the circumscribed area of A in FIG. I in conjunction with the aforementioned physical properties.

While it is difficult to calculate a numerical range of monomer units, for convenience, the following ratios are given: The most preferred type of polymers are depicted in area A and having the following approximate monomer ranges based on moles: $s \approx 0.25$ to $0.55$; $q \approx 0.5$ to $0.666$; and $r \approx 0.334$ to $0.5$. Particularly, area A is bound by the following:
when $s \approx 0.25$ $q \approx 0.5$ to $0.6375$ $r \approx 0.5$ to $0.3625$;

when $s \approx 0.55$;

$q \approx 0.5$ to $0.666$ $r \approx 0.5$ to $0.334$

It is to be noted that there may be polymers that fall within area A and in the above ranges that would be outside of the scope of the present invention as defined by the physical properties required (i.e., a melting point range of about 340° to 400° C., a crystallization temperature of 300° to 340° C. and crystallization rate of at least 1,000 counts/min and an HDT of about 240° to 280° C. and high under a load of 264 psi for 30 weight percent glass fiber filled). As indicated earlier, the compositional areas which cover the materials of this invention are depicted on the attached triangular phase diagram FIG. I. Clearly, their existence was neither anticipated nor predicted by the existing prior art.

The synthesis of the polyesters of the instant invention is described generally in Cottis et al., U.S. Pat. No. 3,637,595 entitled "P-Oxybenzoyl Copolyesters," and in Finestone, U.S. Pat. No. 4,742,149 entitled "Production of Melt Consistent Aromatic Polyesters"; the disclosure of the aforementioned two patents is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride; a prepolymerization step in which the reaction product of the first step is polycondensed to prepare a prepolymer, and the prepolymer is thereafter heated in a third step to produce a polycondensate of the desired degree of polymerization.

Thus, in somewhat greater detail, the instant copolyesters are prepared by charging into the reactor the required amounts of isophthalic and terephthalic acids, p-hydroxybenzoic acid and hydroquinone. An anhydride of a lower monocarboxylic acid, preferably an anhydride of $C_2$ to $C_4$ monocarboxylic acid, is added in at least stoichiometric amounts. It is most preferred to use acetic anhydride; its amount is preferably from about 5 to 20 mole percent over that required for the acetylation of all of the hydroxyl groups. The acetylation reaction takes place at about 140° C. for a period of time of from about 2 to about 6 hours. The reaction mixture is then heated to about 240° to 320° C. at a rate of about 10° to 40° C. per hour, and is kept at about 240° to 320° C. for approximately a few minutes to about 4 additional hours. The low molecular weight polymer obtained is then solid state advanced to the required high molecular weight by heating to a temperature of from about 265° to about 340° C., for a period of time of from about one to about 24 hours.

A preferred variant as described in Finestone, U.S. Pat. No. 4,742,149, comprises adding a salt, particularly an alkaline earth metal salt or an alkali metal salt, preferably potassium sulfate, during the preparation of the resin and particularly to the prepolymer melt prior to advancement of the final product to the desired degree of polymerization. The incorporation of stabilizing amounts of phosphites, as described in Cottis, U.S. Pat. No. 4,639,504 is also advantageous.

The polyesters of the present invention commonly exhibit

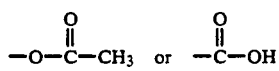

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

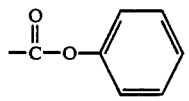

or methyl ester

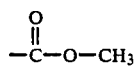

optionally can be included at the end of the polymer chains.

The polymers can be annealed below their melting points for a period of time or the polymers may be oxidatively crosslinked to at least some degree, if desired, by heating in an oxygen-containing atmosphere (e.g., in air) while in bulk form or as a previously shaped article at a temperature below their melting points for a limited period of time (e.g., for a few minutes).

The polyesters of the present invention tend to be substantially insoluble in all common polyester solvents such as hexafluoroisopropanol and o-chlorophenol, and accordingly are not susceptible to solution processing. They can surprisingly be readily processed by known melt processing techniques as discussed hereafter.

The polyesters of the present invention commonly exhibit weight average molecular weights of about 2,000 to about 200,000.

The instant polyesters can be melt processed in the substantial absence of polymer degradation to form a variety of relatively stiff shaped articles, e.g, molded three-dimensional articles, fibers, films, tapes, etc. The polyesters are suitable for molding applications and may be molded via standard injection molding techniques commonly utilized when forming molded articles. Unlike the polyesters commonly encountered in the prior art, it is not essential that more severe injection molding conditions (e.g., higher temperatures), compression molding, impact molding, or plasma spraying techniques be utilized. Fibers or films may be melt extruded. In some instances, as described in Cottis et al., U.S. Pat. No. 4,563,508, melt fabrication may be facilitated by adding flow aids.

The polymers of this invention may contain up to 10 mole percent (based on total reactants) of carbonate linkages and/or aromatic comonomers other than (I)--(IV), such as biphenol, provided that the use of said carbonate linkages and/or comonomers does not unfavorably affect the very attractive properties of the instant copolyesters.

As stated supra, the present invention provides also an improved blend of two wholly aromatic polyester polymers. As used herein, the term "blend" includes any physical blend, mixture, or alloy of the polymeric components. The aromatic polyesters are considered to be "wholly" aromatic in the sense that each moiety present in the polyester contributes at least one aromatic ring to the polymer backbone.

Blends comprising about 1 to about 19, preferably about 1.5 to about 9, parts by weight of a first polyester (a) comprising units (I), (II), (III) and (IV):

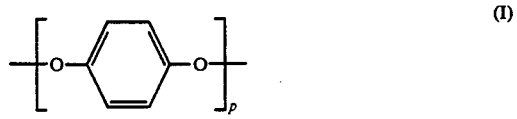

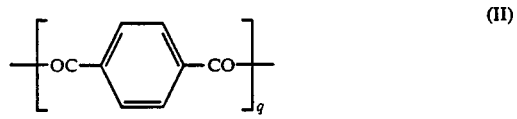

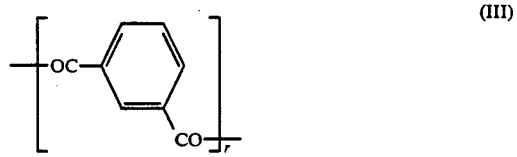

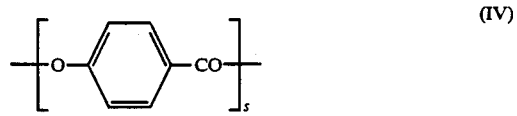

where p is approximately equal to q+r, q is in the range of from about 0.05 to about 0.76; r is in the range of from about 0.95 to about 0.24; s is in the range of from about 0.10 to about 9.0 moles per each mole of unit I; and where said first polyester has a melting point of from about 270° to about 420° C.; and (b) one part by weight of a second polyester comprising units (IX), (X) and (XI):

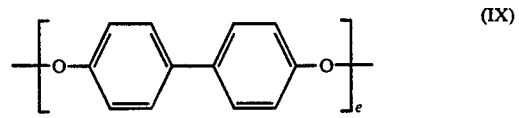

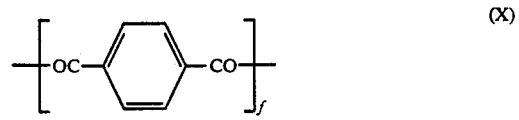

-continued

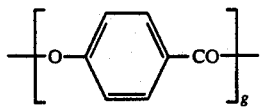

wherein e is approximately equal to f; e is one; and g is in the range of from about 1.5 to about 5, preferably in the range of from about 2 to about 4 moles, per each mole of monomer corresponding to unit (IX); where the molecular weight of said polyesters (a) and (b) are in the range of from about 2,00 to about 200,000; are easy to melt fabricate, display vastly improved moldability, yield parts pleasing to the eye; and, surprisingly, show a reduced tendency to blister on molding. A totally unexpected and surprising feature of the instant blends is that both their moldability and the surface characteristics of the molded objects obtained from them, are better than the corresponding properties of the individual polyesters. In addition, the materials display improved mechanical properties over those of the constituent polymers. Heat distortion temperatures, both on neat or on 30 percent by weight glass fiber filled compositions, are at least 200° C. and may be as high as 350° C. and higher under a load 264 psi.

The novel copolymers of the present invention yield particularly interesting blends comprising a first polyester comprising units derived from a dihydroxyarylene consisting essentially of dihydroxybenzene and dihydroxybiphenyl; nonvicinal benzene dicarboxylic acids and p-hydroxybenzoic acid; and a second polyester comprising units derived from at least one of a naphthalene-based monomer and units derived from a diphenol, a nonvicinal benzene dicarboxylic acid and p-hydroxybenzoic acid.

More particularly, it was discovered that blends comprising about 1 to about 19, preferably about 1.5 to about 9, parts by weight of a first polyester (a) to about 1 part by weight of a second polyester (b), and wherein (a) comprising units (I), (II), (III) and (IV):

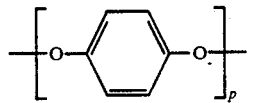

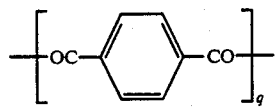

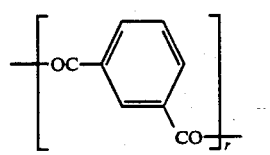

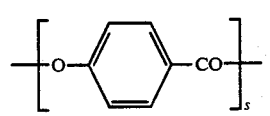

where p is approximately equal to q+r; q is in the range of from about 0.05 to about 0.76; r is in the range of from about 0.95 to about 0.24; s is in the range of from about 0.10 to about 9.0 moles per each mole of unit p; and where said first polyester has a melting point of from about 270° to about 420° C.; (b) comprising units (V), (VI), (VII) and (VIII):

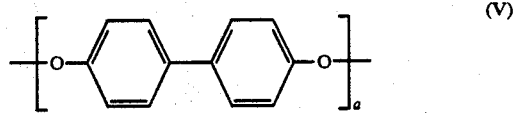

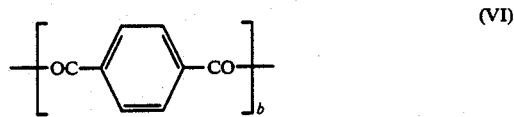

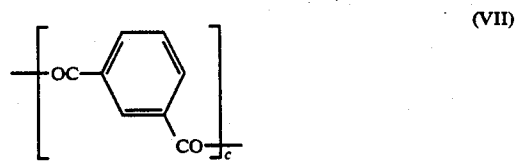

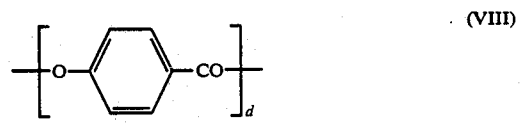

where a is approximately equal to b+c; b is in the range of from about 0.5 to about 0.8; c is in the range of from about 0.5 to about 0.2; and d is in the range of from about 1 to about 7, preferably from about 2 to about 4 moles per each mole of unit (V); where said polyesters (a) and (b) have molecular weights in the range of from about 2,000 to about 200,000, are easy to melt fabricate and yield injection molded parts that surprisingly show a significantly decreased tendency to blister. In addition, the materials display improved mechanical properties over those of the constituent polymers, as well as improved processability, composites containing about 30 weight percent of glass fibers, have heat distortion temperatures (HDT's) of at least 240° C., when measured under a load of 264 psi.

Some of the compositions corresponding to the wholly aromatic polyesters of the first polyester (a) are plotted on the triangular diagram FIG. 1 as discussed supra. The coordinates for each point of this area defines a copolyester in terms of molar percentages of monomer units. The polymers of area A (FIG. 1) are characterized in that (1) they are melt processable below their decomposition temperatures; (2) their melting points are in the range of 340° to 400° C.; (3) their crystallization temperatures are in the range of 300° to 340° C.; (4) their rates of crystallization are at least 1,000 counts per minute; and (5) they yield composites having heat distortion temperatures under a load of 264 psi of about 240° to about 280° C. and higher, when filled with 30 percent by weight of glass fibers.

Also, the instant invention comprises blends of from about 1 to about 19 to about 5 to about 95 parts by weight of a first polyester polymer (a) comprising units (IX), (X), (XI) and (XII):

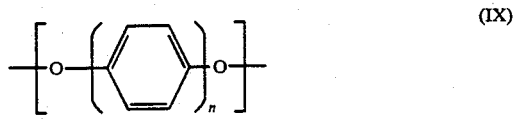

-continued

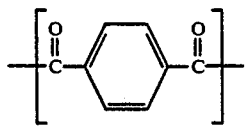
(X)

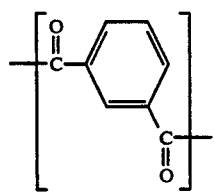
(XI)

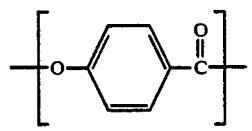
(XII)

where n is 1 or 1 and 2; the number of moles of units (IX) is approximately equal to the number of moles of units (X) and (XI); or a first polyester comprising units (IXb), (IXc), (XIa), (XIIa):

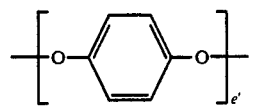
(IXb)

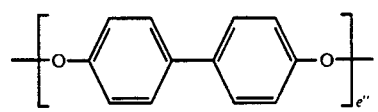
(IXc)

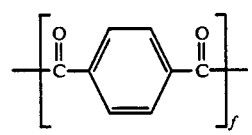
(Xa)

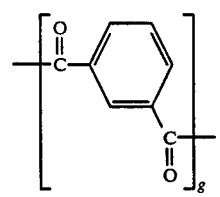
(XIa)

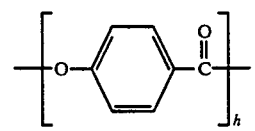
(XIIa)

where e'+e" is approximately equal to f+g; the ratio of e' to e" is from about 3:1 to about 99:1; the ratio of f to g is from about 0.42:1 to about 10:1; and the ratio of h to f+g is from about 0.15:1 to about 8.0:1; moles per one mole of monomers corresponding to the sum of units (IXb)+(IXc); per one part by weight of a second polyester polymer (b) comprising at least one unit:

—X₁—Ar—X₂— (XIII)

wherein Ar comprises at least one member selected from the group consisting of:

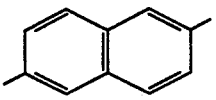
(XIV)

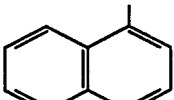
(XV)

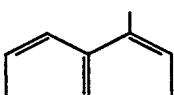
(XVI)

and

(XVII)

$X_1$ and $X_2$ are independently selected from the group consisting of oxy and carbonyl; optionally in conjunction with at least one unit comprising:

—X₁—Ar—X₂— (XVIII)

wherein $X_1$ and $X_2$ are as previously defined, and the Ar group of the second polyester may also comprise a divalent aromatic radical comprising at least one phenylene group, such as phenylene, biphenylene and oxybiphenyl; both polyesters having molecular weights of from about 2,000 to about 200,000.

The instant blends are generally easier to melt fabricate, display improved moldability and yield parts pleasing to the eye with good surface characteristics. Unexpectedly, the materials have improved mechanical properties that are quite often superior to the properties of the two constituent polymers. Heat distortion temperatures, both on neat and on 30 percent by weight glass filled blend compositions, are at least 175° C. and may be as high as 300° C. and even higher, when measured under a load of 264 psi.

As indicated above, the first wholly aromatic polyester useful in the last series of blends of the instant invention comprises units (IX), (X), (XI), (XII), (IXb), (IXc), (Xa), (XIa) and (XIIa). A vast number of materials can be prepared from said monomers; the following compositional ranges are of particular interest [where e, f, g and h denote the molar proportions of said units (IX), (X), (XI) and (XII), respectively]:

(I) those wherein n=1; e is approximately equal to f+g; f is in the range of from about 0.05 to about 0.76; g is in the range of from about 0.95 to about 0.24; h is in the range of from about 0.10 to about 9.0, based on the total number of moles of monomer corresponding to units (IX); and (II) those wherein n is 1 and 2, i.e., which are based on hydroquinone and 4,4'-bisphenol as the dihydric phenol component; the total number of moles of hydroquinone and 4,4'-biphenol (e") is approximately equal to the total number of moles of terephthalic and isophthalic acids (f+g); the ratio of f to g is in the range of about 0.42:1 to about 10:1; the molar ratio of hydroquinone to 4,4'-biphenol is from about 3:1 to about 99:1, and the ratio of h to f and g is 0.15:1 to 8:1.

The second wholly aromatic polyester optionally has in its chain a naphthalene-based monomer. There are of course a great number of materials that meet this requirement. Especially preferred, however, are the copolyesters which are disclosed in U.S. Pat. Nos. 4,161,470; 4,184,996; and 4,256,624, herein incorporated by reference.

The polyester disclosed in U.S. Pat. No. 4,161,470 is a melt processable wholly aromatic polyester which is capable of forming an anisotropic melt phase at a temperature below approximately 350° C. apart from the blend. The polyester consists essentially of the recurring moieties (XIX) and (XX) which may include substitution of at least some of the hydrogen atoms present upon an aromatic ring:

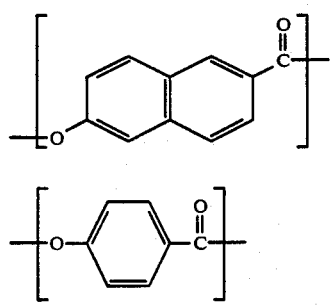

(XIX)

(XX)

with said optional substitution if present being selected from the group consisting of an alkyl group of 1 to 4 carbon atoms, an alkoxy group of 1 to 4 carbon atoms, halogen, and mixtures of the foregoing. The wholly aromatic polyester there disclosed comprises approximately 10 to 90 mole percent of moiety (XIX) and approximately 90 to 10 mole percent of moiety (XX).

The polyester disclosed in U.S. Pat. No. 4,184,996 is a melt processable wholly aromatic polyester which is capable of forming an anisotropic melt phase at a temperature below approximately 325° C. apart from the blend. The polyester consists essentially of the recurring moieties (XX), (XXI), and (XXII):

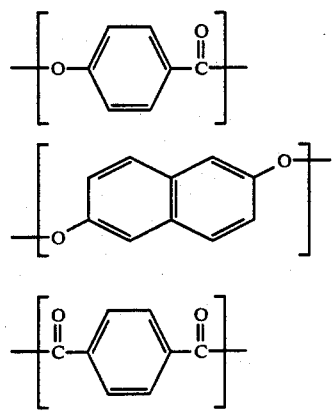

(XX)

(XXI)

(XXII)

The wholly aromatic polyester there disclosed comprises approximately 30 to 70 mole percent of moiety (XX). The polyester preferably comprises approximately 40 to 60 mole percent of moiety (XX); approximately 20 to 30 mole percent of moiety (XXI); and approximately 20 to 30 mole percent of moiety (XXII). Each of the moieties of the polyester is free of ring substitution.

The polyester disclosed in U.S. Pat. No. 4,256,624 is a melt processable wholly aromatic polyester capable of forming an anisotropic melt phase at a temperature below approximately 400° C. apart from the blend. The polyester consists essentially of the recurring moieties (XIX), (XXIII) and (XXIV) which may include substitution of at least some of the hydrogen atoms present upon an aromatic ring:

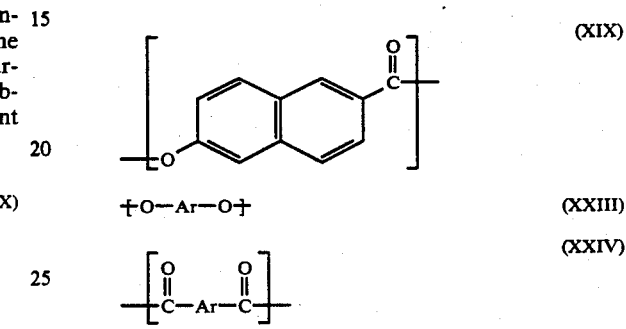

(XIX)

(XXIII)

(XXIV)

wherein Ar is as previously defined; with said optional substitution, if present, being selected from the group consisting of an alkyl group of 1 to 4 carbon atoms, an alkoxy group of 1 to 4 carbon atoms, halogen, a phenyl group and mixtures of the foregoing. The polyester comprises approximately 10 to 90 mole percent of moiety (XIX), approximately 5 to 45 mole percent of moiety (XXIII), and approximately 5 to 45 mole percent of moiety (XXIV).

The phenomenon of blistering is known. Blisters may occur near a surface or in the bulk of the sample. Here, we are mainly concerned with surface blisters; note, however, that small internal blisters or voids may also be detrimental to material performance.

Moldings based on polymers that show orientation in the melt display skin-core effects. Hence, phenomena observed in these systems are often analogous to those encountered in coatings and composites. In composites, for example, blistering and delamination occur especially between two layers of different composition. In coatings, blistering is known to be a localized delamination at an interface; it depends on the diffusion of chemicals such as water and degradation by-products. The difference in the thermal expansion coefficient between a coating and the substrate can create stresses and may weaken the interface. A blister may then form with less pressure difference, due to volatiles, than in cases where these stresses are absent.

In summary thus, blistering is due to a surface layer delamination and can be caused either by trapped volatiles or by built-in stresses. Most probably both factors are at work.

Two types of blistering are encountered with polymeric materials: (1) molding blisters and (2) oven blisters. Blisters which occur during molding generally indicate the presence of degraded material. Quite often parts having acceptable surface characteristics are obtained upon molding. However, when these parts are treated at high temperatures for a certain period of time, blisters ("oven blisters") often appear. These do not necessarily indicate the presence of degraded material as a result of molding.

It is of paramount importance that molding of the polymer does not yield parts having a blistered surface. It should be noted that the configuration of a part is also quite often a factor in mold blistering. In any event, if molding blisters are detected upon visual examination, the part will generally blister to a considerably greater extent when exposed to heat treatment. Thus, the particular molding compound is most probably of inadequate quality. If, on the other hand, a good looking molding part is obtained, there is no assurance as to what the results of "oven testing" will be. For high temperature applications, it is imperative that oven blistering be also either absent or significantly minimized. The oven test and the method of blister rating are described in the Experimental.

The blends of the instant invention show a considerably decreased tendency to blister—both during molding and in the oven test.

Molding compounds and articles may be made from the subject copolyesters and blends by incorporating therein fillers; and/or reinforcing agents. One attractive application of the novel copolyesters of the instant invention is, for example, in ovenware. Both the neat polymer blends, or composites, as disclosed by Duska et al., U.S. Pat. No. 4,626,557 are useful in this application. Molding compounds of interest in ovenware are described in commonly assigned U.S. patent application entitled "Novel Plastic Ovenware Compositions," Ser. No. 255,723. Articles may also be molded from a molding compound which includes, as one component, polymers or blends of the present invention. Such a molding compound incorporates into the present invention approximately 1 to 70 percent, preferably approximately 10 to 55 percent, by weight, based upon the total weight of molding compound, of a solid filler and/or reinforcing agent. Representative agents which may serve as reinforcing media and fillers include glass fibers, asbestos, graphitic carbon fibers, amorphous carbon fibers, synthetic polymeric fibers, aluminum fibers, aluminum silicate fibers, oxide of aluminium fibers, titanium fibers, magnesium fibers, rock wool fibers, steel fibers, tungsten fibers, cotton, wool and wood cellulose fibers, etc., glass beads, calcium silicate, silica, clays, talc, mica, carbon black, titanium dioxide, wollastonite, polytetrafluoroethylene, graphite, alumina trihydrate, sodium aluminium carbonate, barium ferrite, etc. The molding compounds are useful in a variety of applications including high temperature applications, for example, in cookware and electrical articles, and the like.

The novel plastic compositions of the present invention can be fabricated into permanent ovenware capable of repeated use in conventional thermal and microwave ovens.

It has been found in accordance with this invention that a uniform and pleasing appearance can be imparted to ovenware articles and any undesirable bubbling can be suppressed or minimized by the inclusion of talc in the oxybenzoyl compositions from which they are molded. The talc contains a minimum amount of materials decomposable at elevated temperatures, e.g., up to about 800° C., such as magnesium carbonate. Among such talcs are talcs which are of high purity, are selectively combined from various ores or have been calcined or subjected to acid treatment.

These talcs which are employed according to the present invention are characterized by a low weight loss on ignition, a low iron content analyzed as iron oxide, and a closely controlled particle size.

The weight loss on ignition of the suitable talcs is not more than 6 percent or less at 950° C. and is 2 percent or less at 800° C. The iron content analyzed as iron oxide ($Fe_2O_3$) will not be more than about 1 percent and that of the particularly preferred talcs will not be more than about 0.6 percent and may be less. In addition, the particle size distribution of the talc must preferably be such that about 90 to 95 percent of the particles are less than about 40 microns.

Experiments and tests carried out have demonstrated quite conclusively that it is essential to use such talc. The use of other forms of talc does not provide satisfactory properties in the finished molding product. However, such other forms of talc can be employed in conjunction with the specified talcs in amounts of from about 0.05 percent to about 20 percent of the required forms of talc.

The talcs containing the minimum amounts of decomposable material will be present in amounts of from about 1 percent to about 60 percent based on the total composition weight with the preferred range being from about 35 percent to about 55 percent.

Rutile titanium dioxide can also be employed in conjunction with the talc material, including mixtures of highly refined talcs and other talc. The rutile titanium dioxide will be present in a proportion of from about 2 percent to about 20 percent based on the weight of the total composition. The preferred range is from about 2 percent to about 15 percent.

In the ovenware articles of the present invention, the resin will generally comprise from about 30 percent to about 85 percent and the total inerts from about 70 percent to about 15 percent. For optimum results, the inerts will comprise from about 40 percent to about 55 percent of the molding compositions. The inerts will comprise up to about 55 percent of highly refined talc and from about 0 to about 15 percent of titanium dioxide.

The compositions of the present invention can be prepared by extrusion in accordance with generally known practice. For example, a twin screw extruder can be employed with addition of the polymer, selected talc, and titanium dioxide at the feed throat and with addition of the glass roving at both the vent and feed throat.

The compositions so prepared can then be injection molded according to general practice using techniques familiar to the injection molding field.

EXAMPLES

The following examples serve to give specific illustrations of the practice of this invention but they are not intended in any way to limit the scope of this invention. The examples and comparative examples are plotted on the triangular phase diagram.

Experimental Procedures

The following procedures were used to obtain the data given in the examples.

A. X-ray Measurements

1. Apparatus

X-ray diffraction data were obtained using a Philips XRG-3000 X-ray generator equipped with a vertical diffractometer, a long, fine focus copper X-ray tube, a Paar HTK-10 high temperature diffractometer attachment and a Paar HTK-heat controller. Diffractometer position is controlled by computer, which also measures and records radiation count rate produced by sample crystallinity, and sample temperature.

(a) Determination of the Polymer Melting Point

A sample of the polymer is submitted to a preliminary X-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Å d-spacing) reaches its minimum value, i.e., an approximate melting point. A second-degree polynomial equation is derived from the above data; this polynomial equation now allows to follow the peak angle as the sample temperature is varied. The temperature at which the peak height reaches a minimum (i.e., touches the baseline), is considered to be the melting point. The polymer sample is now heated and cooled at a rate of 100° C. per minute between the previously mentioned temperature limits, and its melting point is determined. Since the melting point of a crystalline material often changes on heating and cooling (due to recrystallization, further polymerization, etc.), the sample is cooled and reheated. This allows determination of the melting point on the second heating cycle. Generally, the second cycle yields a melting point which remains approximately constant if additional heating or cooling cycles are performed. Therefore, the value obtained in the second heating cycle is taken as the polymer melting point.

(b) Crystallization Temperature (onset of crystallization)

The onset of crystallization is measured in the same manner except that the scanning (for details, see above), is performed while the sample is cooled at 100° C. per minute. The temperature at which the peak emerges from the baseline during the second cooling cycle is considered as the onset of crystallization.

(c) Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chosen. Rates of crystallization are expressed as the increase in counts per minute for a sample cooled within these temperature limits during the second cooling cycle.

B. DMA Flexural Modulus

The measurement is performed using a Dupont Dynamic Mechanical Analyzer (DMA), Model 982 in conjunction with a thermal analyzer, Model 1090. The DMA measures changes in the viscoelastic properties of materials as a function of time and temperature. Tests are conducted at a heating rate of 5° C. per minute. When the run is complete, the stored data is analyzed; the storage modulus (very similar to the flexural modulus) and the loss modulus are calculated and plotted as a function of temperature. The modulus is expressed in GPa's and the temperature in degrees Centigrade. Conversion into psi's is performed using the equation:

$$\text{Modulus (psi)} = \text{Modulus } (GPa) \times (1.45 \times 10^5)$$

C. Compressive Flow (CF)

The term "Compressive Flow" (CF) as used in this application is a measure of the flow of a weighted sample when pressed on a Carver press at 5,000 pounds. It is also an indirect measure of the polymer molecular weight; the higher the CF value at a given temperature, the lower is the molecular weight of the wholly aromatic polyester.

CF is measured from the area of a disc obtained from a sample of powdered material of given weight, usually 0.5 to 1.0 grams which has been pressed between two parallel plates. In carrying out the determination of this characteristic, a sample is pressed between two sheets of aluminum foil which in turn are backed by chromium-plated steel plates 6"×6"×¼". A Carver 2112-X Model No. 150-C hydraulic press modified for 800° F. is used to press the sample. The particular temperature of the press is that indicated in each sample run. The sample material is allowed to stand for 5 minutes between the plates at holding pressure in order that the temperature of the material can equilibrate with the press temperature. A load of 5,000 pounds is then applied for 2 minutes. The CF is then calculated on the following basis. The area of the pressed molding compound is measured by cutting an aluminum sandwich out of the sample pressed between the two aluminum foil sheets. The aluminum foil has a known area/weight relationship called the foil factor. The area is normalized for pressure of the applied load and that number is multiplied by 100 to give a number greater than 1. The compressive flow is then calculated by means of the following equation:

$$CF = \left[ \frac{\left( \frac{\text{Wt. of circle (sandwich)} - \text{wt. of sample}}{\text{Foil wt. Factor}} \times 50 \right)^2}{\text{Applied Load (Kg)} \times \text{wt. of sample}} \right] \times 100$$

D. Blister Rating

Samples to be tested are preconditioned at 20° to 25° C., 50±5 percent relative humidity for 48 hours. Test sample lot normally includes five tensile bars (⅛" thick), five HDT bars (5"×½"×¼" thick) and five flex bars (5"×½"×⅛" thick). The samples are carefully inspected and any existing cracks and/or blisters are circled. The samples are then annealed in an oven which has been equilibrated at 232° C. (450° F.) for a period of 4 hours. They are then removed, cooled and inspected. Rating codes follow:

0—no new blisters;
1—very slight blistering (one or two very small blisters)
2—slight blistering (three to six small blisters);
3—moderate blistering—(a few large blisters and/or many small blisters; and
4—heavy blistering (many large or small blisters covering more than half of of the specimen surface.

The numerical blister rating is calculated using the equation:

$$R = 1/n \sum_{i=1}^{n} X_i^2$$

where R=numerical blister rating (0-16); n=number of samples tested; $X_i$=blister rating sample i (0-4).

In the above calculation, the individual ratings for the entire set of test samples (tensile bars, HDT bars, flex bars) are generally treated as a single population. The ratings vary within the range of 0 (no blistering) to 16 (severe blistering, worst case).

E. Determination of the Fiber Rating

Fiber ratings were obtained using a hot bar apparatus with a temperature range from 270° to 415° C. A 2 to 5 gram sample of polymer is thinly and evenly sprinkled on the upper portion of the hot bar using a spatula and is allowed to melt. Using a large pair of tweezers, grab a small portion of material from the melted pool and slowly draw a fiber at a steady speed. The following rating system is used:

0—Material does not melt or does not draw a fiber
1—Material draws a short fiber with poor strength
2—Material draws an intermediate length fiber with intermediate level of tenacity or material draws a long fiber with poor strength
3—Material draws a long fiber with good strength
L—An additional rating of L is added to the rating of 0–3 if a low melt temperature occurs which indicates low molecular weight
A—An additional rating of A is added if the melted material is clear which indicates the material is amorphous in the melt state

F. VPS

VPS or vapor phase soldering is an assembly technique used to solder components to a printed circuit board. This technique involves heating a fluid to its boiling point so that a vapor is produced that is above the melting temperature of standard solder. The printed circuit assembly is placed into the vapor blanket. The vapor condenses onto the printed circuit assembly and causes the solder to reflow.

VPS Procedure

1. Samples were processed as received and preconditioned for 7-day intervals at 75% Relative Humidity/Room Temperature.
2. The vapor phase unit used was Model No. 912 II manufactured by HTC.
3. The primary vapor was FC-70 Fluorinert, an inert fluorochemical manufactured by 3M Company. The vapor was at a temperature of 428° F. (220° C.).
4. The secondary vapor was Genesolv D, a trichlortrifluoroethane manufactured by Allied Chemical Company. The vapor was maintained at a temperature of approximately 117° F. (47° C.).
5. The samples were lowered through the secondary vapor into the primary vapor and allowed to dwell for 4 minutes.
6. During the removal cycle, the samples were allowed to dwell for 30 seconds in the Genesolv D vapor and then removed totally.
7. Samples were examined for blistering. If no blistering is evident, then the samples are considered passed. If blisters are evident, the sample has failed.

G. Miscellaneous

The flexural strength of the experimental samples was measured according to the procedure of ASTM D-790-84A; and HDT (DTUL) data were obtained using the method as described in ASTM D648. Tensile strength were measured in accord with ASTM D-638.

POLYMERIZATIONS

Example P-1

This is an example of the synthesis of a novel polyester based on terephthalic acid, isophthalic acid, p-hydroxybenzoic acid, and hydroquinone in the nominal mole ratio of 0.6:0.4:0.5:1. The following ingredients were combined in the manner described.

| Item | Ingredient | Amount |
| --- | --- | --- |
| A | Terephthalic acid | 5.311 kg |
| B | Isophthalic acid | 3.541 kg |
| C | p-Hydroxybenzoic acid | 3.680 kg |
| D | Hydroquinone | 5.868 kg |
| E | Acetic anhydride | 15.645 g |
| F | Magnesium acetate tetrahydrate | 0.46 g |
| G | Triphenyl phosphite | 7.36 g |

Items A through F were charged to a 15-gallon, oil heated vessel equipped with an anchor type stirrer, reflux condenser, after condenser, injection port, and distillate receiver. After purging with nitrogen, the contents were heated with stirring to 141° C. and held under reflux at that temperature for 3 hours. Distillation was then started while increasing the temperature over a 4.8 hour period to 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

The melting point of the polymer (X-ray) was 359° C.; its crystallization temperature was 336° C. with a crystallization rate of 2,400.

A sample of the polymer was melted, extruded and pelletized with a twin screw extruder. The pellets were molded into test specimens. The resulting testing showed superior high temperature performance with a heat distortion temperature of 250° C. and a flexural modulus of 570,000 psi as measured at 250° C. by DMA.

A molding composition containing 70 weight percent of the above polymer and 30 weight percent of milled glass fiber was prepared by compounding on a twin screw extruder and molded into test specimens. The heat distortion temperature of the obtained composite was 264° C. and its flexural modulus (by DMA) was 520,000 psi as measured at 250° C. (ASTM-D-4065).

Example P-2

The ingredients were the same as in Example P-1 with the exception that the amount of item F was 14.16 grams, and that item G was not used in the preparation. The equipment was the same as in example 1 and the operating procedure is described below.

After purging with nitrogen, the contents were heated with stirring to 141° C. and held under reflux at that temperature for 3 hours. Distillation was then started with increasing the temperature over a 3.6 hour period to 250° C. The reaction mixture was then stirred for 1 hour at 250°–260° C.

The contents of the vessel were transferred to a sigma blade mixer which had been preheated to about 250° C. The material was mixed while the temperature was increased to 300° C. and mixing was continued for a total of 5 hours at that temperature.

A molding composition containing 70 weight percent of the above polymer and 30 weight percent of milled glass fiber was prepared by compounding on a twin screw extruder and molded into test specimens. The heat distortion temperature of the obtained composite was 250° C. and its flexural modulus (by DMA) was 420,000 psi as measured at 250° C. (ASTM-D-4065).

Example P-3

The ingredients were the same as in Example P-2 with the exception of item F the amount of which was 7.08 grams; also, 16.00 grams of triphenyl phosphite were added prior to transfer of the reaction mixture to the sigma blade mixer. Otherwise, the procedure was the same as in Example P-2.

The melting point of the polymer (X-ray) was 359° C.; its crystallization temperature was 329° C. with a crystallization rate of 2,500.

A molding composition containing 70 weight percent of the above polymer and 30 weight percent of milled glass fiber was prepared by compounding on a twin screw extruder and molded into test specimens. The heat distortion temperature of the obtained composite was 268° C. and its flexural modulus (by DMA) was 480,000 psi as measured at 250° C. (ASTM-D-4065).

Example P-4

This is an example of the synthesis of a novel polyester based on terephthalic acid, isophthalic acid, p-hydroxybenzoic acid and hydroquinone in the nominal mole ratio of 0.6:0.4:0.75:1. The following ingredients were combined in the manner described:

| Item | Ingredient | Amount |
|---|---|---|
| A | Terephthalic acid | 4.829 kg |
| B | Isophthalic acid | 3.219 kg |
| C | p-Hydroxybenzoic acid | 5.018 kg |
| D | Hydroquinone | 5.334 kg |
| E | Acetic anhydride | 15.645 kg |
| F | Magnesium acetate tetrahydrate | 0.46 g |
| G | Triphenyl phosphite | 7.36 g |

These ingredients were processed as described in Example P-1.

The melting point of the polymer (X-ray) was 353° C.; its crystallization temperature was 331° C. with a crystallization rate of 2,100.

A molding composition containing 70 weight percent of the above polymer and 30 weight percent of milled glass fiber was prepared by compounding on a twin screw extruder and molded into test specimens. The heat distortion temperature of the obtained composite was 240° C.

Additional polymers were examined in Tables I–IV. The polymers of the tables were prepared using the mole percentage of monomers delineated in the table and reacting them in the same manner as P-1 to P-4.

COMPARATIVE EXAMPLE 1

This example describes the preparation of a polyester in the laboratory. It is to be noted that the preferred method is described in Comparative Example 2 wherein the polymers were produced in scaled-up size in the pilot plant. There a continuous method of in situ polymerization was utilized which is more demonstrative of scale-up production and economies. Unfortunately in scale-up production, physical and mechanical characteristics can be varied as compared to laboratory production. The polyester had the molar composition: terephthalic acid/isophthalic acid/p-hydroxybenzoic acid/hydroquinone 0.5/0.5/1.0/1.0 (see Cottis et al., U.S. Pat. No. 3,637,595; example no. 10, noted as designation "x" on FIG. 1). The properties of this polymer do not meet the requirements of the polyesters of the instant invention.

A 5 liter resin flask equipped with a stirrer, condenser system designed both for reflux and distillation, and a heating mantle was charged with the following:

- 1,092.5 g of p-hydroxylbenzoic acid;
- 657.1 g of terephthalic acid;
- 657.1 g of isophthalic acid;
- 871.0 g of hydroquinone; and
- 2,786.0 g of acetic anhydride.

The above mixture was heated at reflux for a period of 3 hours; vigorous stirring was maintained throughout the reaction. At the end of the reflux period collection of distillate was started. The reaction mass was then heated at a rate of about 30° C. per hour to 311° C. at which point 98.2 percent of the theoretical distillate was collected. The molten material was poured into an aluminum pan and allowed to cool to room temperature. The solid was pulverized and ground to pass a 2 millimeter screen. The powder was placed in a drum and was heated in a nitrogen stream, while rotating, to a temperature of 330° C.; and held at that temperature for two hours. The product was removed from the drum after cooling.

The melting point of the polymer (X-ray) was 325° C.; its crystallization temperature (onset of crystallization) and crystallization rate (both measured via X-ray techniques) were 299° C. and 2,242, respectively.

A portion of the product was pelletized and injection molded into test specimens. The neat polymer had a HDT of 226° C., a flex strength of 16,000, a flex modulus of $1.85 \times 10^6$ and a blister rating of 16.

Another portion of the product was compounded with milled glass fiber to prepare a pelletized material containing 30 percent glass. Injection molding yielded test specimens which were very brittle. Therefore, to run HDT analyses, ⅛" Flex Bars were used. The HDT was 233° C.

COMPARATIVE EXAMPLE 2

This example describes the preparation of a polyester having the mole ratio of 0.5/0.5/1.0/1.015. The following ingredients were combined in the manner described:

| Item | Ingredient | Amount |
|---|---|---|
| A | Terephthalic acid | 3.678 kg |
| B | Isophthalic acid | 3.678 kg |
| C | p-Hydroxybenzoic acid | 6.115 kg |
| D | Hydroquinone | 4.948 kg |
| E | Acetic anhydride | 15.782 kg |
| F | Magnesium acetate tetrahydrate | 7.06 g |
| G | Triphenyl phosphite | 16.00 g |

Items A through F were charged to a 15-gallon, oil heated vessel equipped with an anchor type stirrer, reflux condenser, after condenser, injection port, and distillate receiver. After purging with nitrogen, the contents were heated with stirring to 141° C. and held under reflux at that temperature for 3 hours. Distillation was then started while increasing the temperature 30° C./hour to 273° C. Item G was then injected into the vessel. After the reactor reached 277° C. the contents of the vessel were transferred to a sigma blade mixer that had been preheated to 285° C. After mixing for 5 hours at this temperature under an atmosphere of nitrogen, the mixer was cooled to near room temperature where the contents were removed as a granular solid.

The melting point of the polymer (X-ray) was 349° C.; its crystallization temperature was 331° C. with a crystallization rate of 1667.

A sample of the polymer was blended with glass, melted, extruded, and pelletized with a twin screw extruder. The pellets were molded into test specimens. The resulting testing showed lower temperature performance with a 264 psi heat distortion temperature of only 214° C.

BLENDS

Preparative Examples

Example B-1

Preparation of polyester having the following molar composition: 0.25 moles isophthalic acid/0.75 moles terephthalic acid/3.0 moles p-hydroxybenzoic acid/1.0 mole, 4,4'-biphenol. A mixture of:
- 184 lbs of terephthalic acid;
- 61 lbs of isophthalic acid;
- 612 lbs of low ash p-hydroxybenzoic acid;
- 275 lbs of 4,4'-biphenol;
- 868 lbs of acetic anhydride; and
- 40.1 grams (88.5 ppm) of magnesium acetate tetrahydrate was placed in a 325 gallon rector and heated with stirring until distillation started. The rector was held at this temperature for 3 hours. Distillation was started and the temperature increased until 400 pounds of distillate has been collected. The contents were pressured into a 200 gallon reactor and the temperature was increased at a rate of 30° C. per hour until the contents reached 313° C. Then the contents were poured into a mechanical mixer and mixed at 290° to 300° C. for 5 hours. Six batches of polymers were made with compressive flows at 330° C. from 55 to 74, and polymer had very good color.

Example B-2

Preparation of polyester having the following molar composition: 1 mole terephthalic acid/3.7 moles p-hydroxybenzoic acid/1 mole 4,4'-biphenol.

The following ingredients were combined in the manner described:

| Item | Ingredient | Amount |
|---|---|---|
| A | Terephthalic acid | 1.638 kg |
| B | p-Hydroxybenzoic acid | 5.039 kg |
| C | 4,4'-Biphenol | 1.837 kg |
| D | Acetic anhydride | 6.600 kg |
| E | Potassium sulfate | 0.5 g |
| F | Pentaerythritol diphosphite | 6.6 g |

Items A through E were charged into the rector and heated to 307° C. over a period of 10 hours with distillation of acetic acid. Item F was then added and heating was continued for 6 minutes to a melt temperature of 310° C. The contents of the vessel were transferred to a sigma blade mixer that had been preheated to 335° C. The temperature was raised to 350° C and mixing was continued at 350° C. for 9.5 hours under an atmosphere of nitrogen. The mixer was cooled to near room temperature where the contents were removed as a granular solid having a compressive flow of 52.

Example B-3

The naphthalene-based polyester used in the instant blends was Vectra ® A950, produced by the Hoechst-Celanese Corporation and composed of about 73 mole percent 4-oxybenzoyl moieties (XX) and 27 mole percent of 6-oxy-2-naphthoyl moieties (XIX):

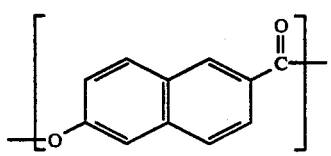

(XIX)

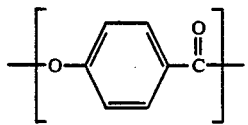

(XX)

PREPARATION OF POLYESTER BLENDS

General

Polyesters prepared as described in preparative examples B-1 and B-2 were formulated into a 30 percent glass filled composition, compounded and pelletized. The blends contained as a percentage of the resins phase, either 0, 10, 21 or 40 weight percent of polymer (B). The formulations were compounded and pelletized on a 25 mm diameter Berstorff twin screw extruder. The barrel profile temperature for compounding was:
- Barrel zone 1=320° to 325° C.
- Barrel zone 2=355° to 362° C.
- Barrel zone 3=355° to 376° C.
- Barrel zone 4=365° to 395° C.
- Barrel zone 5=380° to 400° C.
- Barrel zone 6=370° to 380° C.
- Barrel zone 7=360° to 370° C.
- Die=355° to 380° C.

The screw rpm was 170 to 175; the output was 12 to 15 pounds per hour.

The above materials were molded on a 75 ton, 3 ounce Newbury injection molding machine. The barrel profile was:
- Rear zone about 377° C.
- Front zone about 382° C.
- Nozzle about 388° C.

The mold temperature was set at 121° C. and the injection pressure was in the range of 1,000 to 1,360 psi. The molding machine screw rpm was about 330.

The formulations of Table VII were compounded and pelletized on a 25 mm diameter Berstorff twin screw extruder. The barrel profile temperature for compounding was:
- Barrel zone 1=293° to 320° C.
- Barrel zone 2=360° to 376° C.
- Barrel zone 3=375° to 400° C.
- Barrel zone 4=395° to 405° C.

Barrel zone 5=390° to 400° C.
Barrel zone 6=370° to 385° C.
Barrel zone 7=375° to 387° C.
Die=370° to 387° C.
The screw rpm was 175 with an output of about 10 to 13 pounds per hour.

The above materials were molded on a 75 ton, 3 ounce Newbury injection molding machine having the following barrel temperature profile:
Rear zone about 377° C.
Front zone about 382° C.
Nozzle about 388° C.

The mold temperature was set at 120° C. for composition no. 7 and at 66° C. for all other compositions. The injection pressure was 1,000 psi and the molding machine screw rpm was about 330.

Blends of Table XI (test nos. 21-32):
Barrel zone 1=150° to 176° C.
Barrel zone 2=270° to 345° C.
Barrel zone 3=285° to 365° C.
Barrel zone 4=275° to 370° C.
Barrel zone 5=270° to 370° C.
Barrel zone 6=280° to 365° C.
Barrel zone 7=275° to 360° C.
Die=270° to 355° C.

Blends of Table XI (test nos.33-40):
Barrel zone 1=185° to 301° C.
Barrel zone 2=370° to 385° C.
Barrel zone 3=385° to 400° C.
Barrel zone 4=390° to 400° C.
Barrel zone 5=385° to 390° C.
Barrel zone 6=375° to 380° C.
Barrel zone 7=370° to 376° C.
Die=370° to 374° C.

Blends of Table XI (test nos. 41-44):
Barrel zone 1=320° C.
Barrel zone 2=355° to 360° C.
Barrel zone 3=370° to 375° C.
Barrel zone 4=390° to 395° C.
Barrel zone 5=390° C.
Barrel zone 6=370° C.
Barrel zone 7=370° to 376° C.
Die=350° to 375° C.

The screw rpm was in the range of 120 to 175 for all the blends; the output was about 10 to 13 pounds per hour.

The above materials were molded on a 75 ton 3 ounce Newbury injection molding machine having the following barrel temperature profile:

Blends of Table XI (test nos. 21-32):
Rear zone=376° to 337° C.
Front zone=271° to 337° C.
Nozzle=282° to 348° C.

Blends of Table XI (test nos. 33-40):
Rear zone=337° to 388° C.
Front zone=332° to 382° C.
Nozzle=343° to 393° C.

Blends of Table XI (test nos. 41-44):
Rear zone=299° to 371° C.
Front zone=288° to 377° C.
Nozzle=299° to 382° C.

The mold temperature was set at 66° for compositions 21 to 32 and 36; it was 99° C. for no 44 and 120° C. in all other examples. The injection pressure was:
1,000 psi in examples: Table XI, 21,27,28,29,30,31,32,35,36,37 and 38;
1,400 psi in all other blend examples.
The molding machine screw rpm was set at 330.

Examinations of the table shows that the blends can generally be fabricated at lower temperatures than the corresponding controls; therefore there is less change of decomposition and concurrently less blistering.

SUMMARY OF TABLES

Tables I-V: Properties of Nest and Glass-Filled Polymers

Tables I-III

Table I lists some polyesters whose properties meet the specifications of the polymers of the instant invention as far as melting point, crystallization temperature and crystallization rate are concerned.

Table II lists other polyesters which are borderline resins, i.e., those where (a) at least one of the three basic properties (melting point, crystallization temperature and crystallization rate—all as measured by X-ray techniques) is within the required range, the other two properties being outside of the range, but very close to it; or (b) where all three properties are in the required range, but the HDT does not satisfy the requirements and/or the material is not moldable.

Table III lists still other polymers whose properties are outside of the specifications of this invention.

The data clearly show that well defined ratios of monomers are critical if one wants to achieve polyesters having the outstanding characteristics as described in this application.

Table IV: Polymers

Table IV shows other polymers derived from the monomers and %'s shown and the mechanical properties of these polymers. It depicts that the A region (which corresponds to the triangular diagram FIG. 1) has a higher HDT than the X region (Cottis U.S. Pat. No. 3,637,595) and also an improved blister rating, tensile strength, and % elongation.

Table V: Polymer Fiber Rating

Table V depicts polymers derived from the monomers and %'s as listed. It shows an improved fiber rating of the A region over the other non-designated regions of the phase diagram. It is noteworthy that region C (which is the subject of another application filed concurrently herewith) has even more favorable fiber ratings.

Tables VII-XIII: Blends of Polyesters (a) and (b) and their properties

Table VII discloses blends of three different polyesters. The properties of these blends are shown in Tables VIII-X.

Table XI depicts other blends and Table XII depicts the properties of blends of Table XI.

The blends have lower injection molding temperatures than the base polymer showing they can be fabricated at lower temperatures. The data clearly show that the blends display improved mechanical properties—see, for example, flexural strengths and blister ratings of Table VIII tests 4-6. The high HDT's of the novel blends are noteworthy; they are intermediate between those of the constituent polymers of the blends. This in turn could be interpreted as a result of compatibility for the instant highly crystalline polyesters. DMA modulus data show that stiffness is maintained up to quite high temperatures, making the present materials useful at elevated temperatures. In conclusion, therefore, the blends of this invention possess a combination of toughness, surface, and high temperature properties that could not be anticipated beforehand.

TABLE I

| Example No.[a] | Composition | | | Melting Point (°C.) | Cryst. Temp. (°C.) | Cryst. Rate [b] |
|---|---|---|---|---|---|---|
| | q | r | s | | | |
| 5 | 0.20 | 0.80 | 5.00 | 340 | 316 | 2000 |
| 6 | 0.50 | 0.50 | 2.00 | 367 | 334 | 2473 |
| 7 | 0.50 | 0.50 | 1.25 | 351 | 315 | 2500 |
| 8 | 0.60 | 0.40 | 0.60 | 366 | 329 | 2420 |
| 9 | 0.538 | 0.462 | 0.538 | 341 | 308 | 1350 |
| 10 | 0.571 | 0.429 | 0.429 | 384 | 325 | 1636 |
| 11 | 0.60 | 0.40 | 0.333 | 357 | 330 | 3115 |
| 12 | 0.53 | 0.47 | 0.333 | 343 | 300 | 2210 |
| 13 | 0.60 | 0.40 | 0.250 | 393 | 331 | 1920 |

[a] The polymers were prepared via methods similar to that used in comparative Example 2. In all of the examples, p is one.
[b] Counts per minute.

TABLE II

| Example No.[a] | Composition[c] | | | Melting Point (°C.) | Cryst. Temp. (°C.) | Cryst. Rate[e] | Remarks[d] |
|---|---|---|---|---|---|---|---|
| | q | r | s | | | | |
| 14 | 0.30 | 0.70 | 7.00 | 393 | 359 | 3100 | — |
| 15 | 0.20 | 0.80 | 7.00 | 393 | 359 | 3100 | — |
| 16 | 0.10 | 0.90 | 7.00 | 370 | 343 | 2600 | — |
| 17 | 0.00 | 1.00 | 7.00 | 353 | 323 | 2100 | Poor processability HDT = 219° C. |
| 18 | 0.40 | 0.60 | 5.00 | 389 | 352 | 2800 | — |
| 19 | 0.30 | 0.70 | 5.00 | 373 | 341 | 2700 | — |
| 20[b] | 0.50 | 0.50 | 1.50 | 343 | 313 | 2500 | Neat polymer fused at 450° C. with decomposition (smoke) when compounding was attempted. |
| 21 | 0.60 | 0.40 | 1.25 | 387 | 347 | 2810 | — |
| 22[b] | 0.60 | 0.40 | 1.00 | 361 | 335 | 2700 | Same as Example 20 |
| 23 | 0.50 | 0.50 | 1.00 | 334 | 300 | 1794 | — |
| 24 | 0.60 | 0.40 | 1.00 | 389 | 341 | 3200 | — |
| 25 | 0.50 | 0.50 | 0.75 | 362 | 291 | 2000 | — |
| 26 | 0.55 | 0.45 | 0.60 | 333 | 311 | 1510 | — |
| 27 | 0.615 | 0.385 | 0.538 | 381 | 344 | 3860 | — |
| 28 | 0.643 | 0.357 | 0.429 | 400 | 351 | 2500 | — |
| 29 | 0.50 | 0.50 | 0.429 | 334 | 294 | 2100 | — |
| 30 | 0.47 | 0.53 | 0.333 | 366 | 304 | 820 | — |
| 31 | 0.00 | 1.00 | 0.10 | 387 | 309 | 430 | — |

[a] Prepared in a manner similar to that of Comparative Example 1, except where otherwise indicated.
[b] Prepared in a manner similar to that of Example P-1.
[c] In all examples p is equal to one.
[d] HDT measured on 30 percent by weight milled glass filled compositions.
[e] Counts per minute.

TABLE III

| Example No.[a] | Composition[c] | | | Melting Point (°C.) | Cryst. Temp. (°C.) | Cryst. Rate[f] | Remarks[d] |
|---|---|---|---|---|---|---|---|
| | q | r | s | | | | |
| 32 | 1.00 | 0.00 | 7.00 | 486 | 445 | 4200 | Could not compound or mold. |
| 33 | 0.80 | 0.20 | 7.00 | 433 | 413 | 4706 | — |
| 34 | 0.70 | 0.30 | 7.00 | 453 | 410 | 5400 | — |
| 35 | 0.60 | 0.40 | 7.00 | 437 | 399 | 5100 | — |
| 36 | 0.50 | 0.50 | 7.00 | 428 | 389 | 4800 | — |
| 37 | 0.40 | 0.60 | 7.00 | 419 | 380 | 4200 | — |
| 38 | 1.00 | 0.00 | 5.00 | 497 | 456 | 4700 | Could not compound or mold. |
| 39 | 0.80 | 0.20 | 5.00 | 460 | 427 | 4600 | — |
| 40 | 0.70 | 0.30 | 5.00 | 443 | 403 | 4200 | — |
| 41 | 0.60 | 0.40 | 5.00 | 448 | 388 | 4500 | — |
| 42 | 0.50 | 0.50 | 5.00 | 413 | 376 | 3200 | — |
| 43[b] | 0.35 | 0.65 | 5.00 | — | — | — | Heavy smoke and decomposition during extrusion. |
| 44 | 0.10 | 0.90 | 5.00 | 324 | 300 | 2200 | — |
| 45 | 0.00 | 1.00 | 5.00 | 298 | 296 | 310 | — |
| 46 | 1.00 | 0.00 | 4.00 | 492 | 458 | 3300 | — |
| 47 | 1.00 | 0.00 | 3.00 | 497 | 460 | 3500 | Could not compound or mold. |
| 48 | 0.90 | 0.10 | 3.00 | 492 | 452 | 6740 | — |
| 49 | 0.80 | 0.20 | 3.00 | 468 | 431 | 6410 | — |
| 50 | 0.70 | 0.30 | 3.00 | 446 | 406 | 6620 | — |
| 51 | 0.60 | 0.40 | 3.00 | 369 | 408 | 4550 | — |
| 52 | 0.00 | 1.00 | 3.00 | 204 | 204 | 617 | Processing marginal; HDT = 175° C.[d] |
| 53 | 0.00 | 1.00 | 2.50 | Weak | Weak | Weak | Processing adequate; HDT = 163° C.[d] |
| 54 | 1.00 | 0.00 | 2.00 | 520 | 481 | 6700 | Could no compound or mold. |
| 55 | 0.70 | 0.30 | 2.00 | 415 | 398 | 5000 | — |

TABLE III-continued

| Example No.(a) | Composition(c) q | r | s | Melting Point (°C.) | Cryst. Temp. (°C.) | Cryst. Rate(f) | Remarks(d) |
|---|---|---|---|---|---|---|---|
| 56 | 0.60 | 0.40 | 2.00 | 405 | 368 | 5066 | — |
| 57 | 0.40 | 0.60 | 2.00 | 329 | 300 | 1789 | — |
| 58 | 0.30 | 0.70 | 2.00 | 299 | 269 | 1368 | — |
| 59 | 0.20 | 0.80 | 2.00 | 300 | 248 | 842 | — |
| 60 | 0.00 | 1.00 | 2.00 | Weak | Weak | Weak | Processing adequate; HDT = 175° C.(d). |
| 61 | 0.00 | 1.00 | 1.75 | 400 | 368 | 208 | Processing adequate; HDT = 142° C.(e). |
| 62(b) | 0.75 | 0.25 | 1.50 | 440 | 404 | 4200 | Decomposed; did not melt. |
| 63(b) | 0.67 | 0.33 | 1.50 | 413 | 377 | 4200 | Neat polymer fused at 450° C. w/decomposition (smoke) when compounding was attempted. |
| 64 | 0.60 | 0.40 | 1.50 | 387 | 353 | 2500 | As above. |
| 65 | 0.40 | 0.60 | 1.50 | 289 | 279 | 962 | — |
| 66 | 0.30 | 0.70 | 1.50 | 249 | 240 | 850 | Processing marginal; HDT = 218° C.(e). |
| 67 | 0.20 | 0.80 | 1.50 | 231 | 223 | 490 | — |
| 68 | 0.10 | 0.90 | 1.50 | Weak | Weak | Weak | — |
| 69 | 0.00 | 1.00 | 1.50 | — | — | — | Processing adequate; HDT = 187° C.(e). |
| 70 | 0.70 | 0.30 | 1.25 | 428 | 392 | 6068 | — |
| 71 | 0.40 | 0.60 | 1.25 | 304 | 272 | 1375 | — |
| 72 | 0.30 | 0.70 | 1.25 | 267 | 260 | 588 | — |
| 73 | 1.00 | 0.00 | 1.00 | 523 | 490 | 2700 | Could not be compounded or molded. |
| 74 | 0.80 | 0.20 | 1.00 | 466 | 432 | 4100 | — |
| 75 | 0.70 | 0.30 | 1.00 | 440 | 392 | 2000 | — |
| 76 | 0.40 | 0.60 | 1.00 | 256 | 251 | 900 | — |
| 77 | 0.30 | 0.70 | 1.00 | 235 | 235 | 350 | — |
| 78 | 0.20 | 0.80 | 1.00 | Weak | Weak | Weak | — |
| 79 | 0.10 | 0.90 | 1.00 | Weak | Weak | Weak | — |
| 80 | 0.00 | 1.00 | 1.00 | Weak | Weak | Weak | — |
| 81 | 0.80 | 0.20 | 0.75 | 464 | 430 | 6820 | — |
| 82 | 0.70 | 0.30 | 0.75 | 421 | 382 | 5000 | — |
| 83 | 0.40 | 0.60 | 0.75 | 298 | 272 | 580 | — |
| 84 | 0.20 | 0.80 | 0.75 | 342 | Weak | Weak | — |
| 85 | 0.00 | 1.00 | 0.75 | 334 | 334 | 160 | — |
| 86 | 0.462 | 0.538 | 0.538 | 339 | 290 | 763 | — |
| 87 | 1.00 | 0.00 | 0.50 | 592 | 534 | 3420 | — |
| 88 | 0.30 | 0.70 | 0.50 | 391 | 391 | 69 | — |
| 89 | 0.00 | 1.00 | 0.50 | 376 | 285 | 150 | — |
| 90 | 0.80 | 0.20 | 0.25 | 471 | 438 | 4300 | — |
| 91 | 0.70 | 0.30 | 0.25 | 421 | 370 | 3100 | — |
| 92 | 0.50 | 0.50 | 0.25 | 425 | 317 | 100 | — |
| 93 | 0.30 | 0.70 | 0.25 | 374 | 325 | 71 | — |
| 94 | 0.00 | 1.00 | 0.25 | 354 | 243 | 113 | — |
| 95 | 0.61 | 0.39 | 0.22 | 420 | 343 | 1292 | — |
| 96 | 0.41 | 0.59 | 0.18 | 420 | Weak | Weak | — |
| 97 | 0.70 | 0.30 | 0.10 | 432 | 396 | 2090 | — |
| 98 | 0.50 | 0.50 | 0.10 | 400 | 350 | 600 | — |
| 99 | 0.30 | 0.70 | 0.10 | Weak | Weak | Weak | — |
| 100 | 0.80 | 0.20 | 0.00 | 531 | 525 | 3400 | — |
| 101 | 0.70 | 0.30 | 0.00 | 540 | 504 | 4300 | — |
| 102 | 0.10 | 0.90 | 0.00 | 402 | 338 | 120 | — |

(a)Polymers were prepared in a manner similar to that of Comparative Example 1, except where noted.
(b)Prepared as described in Example P-1.
(c)In all Examples p is equal to 1.
(d)Measured on a 37 weight percent talc filled composition.
(e)Measured on a 30 weight percent milled glass filled composition.
(f)Counts per minute.

TABLE IV

| No. | Monomers q | r | s | Tensile Strength | % Elongation | TM ×10$^6$ | Flex Strength | Flex Mod ×10$^6$ | °C. HDT | Region | Blister Rating | VPS 0 Days | 7 Days | 14 Days | 21 Days |
|---|---|---|---|---|---|---|---|---|---|---|---|---|---|---|---|
| 103 | 0.5 | 0.5 | 1.0 | 4050 | 0.3 | 0.82 | — | — | — | X | 16.0 | fail | fail | — | — |
| *104 | 0.5 | 0.5 | 1.0 | 6680 | 0.5 | 2.04 | 12810 | 1.5 | 214 | X | 16.0 | | | | |
| 105 | 0.5 | 0.5 | 0.667 | — | — | — | 14660 | 1.44 | 207 | None | 16.0 | | | | |
| *106 | 0.5 | 0.5 | 0.667 | — | — | — | 16340 | 1.94 | 233 | None | 16.0 | | | | |
| 107 | 0.387 | 0.617 | 0.667 | — | — | — | 21610 | 2.03 | 198 | C | 16.0 | pass | pass | — | — |
| *108 | 0.387 | 0.617 | 0.667 | — | — | — | 19330 | 2.4 | 220 | C | 13.5 | | | | |
| 109 | 0.446 | 0.554 | 0.538 | — | — | — | 15990 | 1.48 | 198 | C | 10.9 | pass | pass | — | — |
| *110 | 0.446 | 0.554 | 0.538 | — | — | — | 15800 | 1.77 | 229 | C | 8.0 | | | | |
| 111 | 0.6 | 0.4 | 0.5 | — | — | — | 12800 | 1.27 | 238 | A | 9.0 | fail | fail | — | — |
| 112 | 0.6 | 0.4 | 0.5 | — | — | — | 12180 | 1.51 | 243 | A | 9.0 | | | | |
| 113 | 0.6 | 0.4 | 0.5 | 5600 | 0.51 | 1.0 | 13600 | 0.95 | 225 | A | 9.0 | | | | |

TABLE IV-continued

| No. | Monomers q | r | s | Tensile Strength | % Elongation | TM ×10⁶ | Flex Strength | Flex Mod ×10⁶ | °C. HDT | Region | Blister Rating | VPS 0 Days | 7 Days | 14 Days | 21 Days |
|---|---|---|---|---|---|---|---|---|---|---|---|---|---|---|---|
| *114 | 0.6 | 0.4 | 0.5 | 8700 | 0.55 | 1.5 | 13600 | 1.58 | 264 | A | 6.1 | | | | |
| 115 | 0.6 | 0.4 | 0.5 | 18400 | 0.92 | 2.2 | 19400 | 1.65 | 283 | A | 7.3 | | | | |
| *116 | 0.6 | 0.4 | 0.5 | 14600 | 0.76 | 2.5 | 18800 | 1.68 | 288 | A | 11.3 | | | | |
| 117 | 0.45 | 0.55 | 0.5 | 7960 | 0.4 | 1.86 | 20160 | 1.57 | 246 | C | 7.2 | pass | pass | pass | pass |
| 118 | 0.45 | 0.55 | 0.5 | 5390 | 0.2 | 1.89 | 19504 | 1.69 | 240 | C | 2.8 | | | | |
| *119 | 0.45 | 0.55 | 0.5 | 8830 | 0.3 | 2.6 | 16801 | 1.89 | 250 | C | 1.1 | pass | | | |
| *120 | 0.45 | 0.55 | 0.5 | — | — | — | 18920 | 1.94 | 259 | C | 5.3 | | | | |
| 121 | 0.5 | 0.5 | 0.4285 | — | — | — | 21200 | 1.81 | 229 | A,C | 9.0 | | | | |
| *122 | 0.5 | 0.5 | 0.4285 | — | — | — | 19720 | 1.82 | 246 | A,C | 9.0 | | | | |
| 123 | 0.5 | 0.5 | 0.4285 | 6320 | 0.4 | 1.63 | 16990 | 1.4 | 245 | A,C | 8.0 | pass | pass | pass | pass |
| *124 | 0.5 | 0.5 | 0.4285 | 11360 | 0.61 | 2.18 | 15670 | 1.83 | 269 | A,C | 9.6 | | | | |
| 125 | 0.4142 | 0.5858 | 0.4285 | — | — | — | 25510 | 2.07 | 222 | C | 10.9 | pass | pass | — | — |
| *126 | 0.4142 | 0.5858 | 0.4285 | — | — | — | 24370 | 2.08 | 225 | C | 9.0 | | | | |
| 127 | 0.4142 | 0.5858 | 0.4285 | — | — | — | 18680 | 1.63 | 219 | C | 4.2 | pass | pass | — | — |
| *128 | 0.4142 | 0.5858 | 0.4285 | — | — | — | 19780 | 1.88 | 239 | C | 2.0 | | | | |
| 128a | 0.470 | 0.530 | 0.30 | — | — | — | 18470 | 2.01 | 264 | C | 0.33 | | | | |

*30% glass-filled

TABLE V

FIBER RATING OF POLYMERS

| No. | Monomers q moles | % | r moles | % | s moles | % | Fiber Rating | Region |
|---|---|---|---|---|---|---|---|---|
| 129 | 1.0 | 21 | 0.0 | 0 | 3.7 | 79 | 3-A | C |
| 130 | 0.0 | 0 | 1.0 | 33 | 2.0 | 67 | 3-A | C |
| 131 | 0.7 | 23 | 0.3 | 10 | 2.0 | 67 | 0 | |
| 132 | 0.3 | 10 | 0.7 | 23 | 2.0 | 67 | 0 | |
| 133 | 0.75 | 30 | 0.25 | 10 | 1.5 | 60 | 0 | |
| 134 | 0.5 | 20 | 0.5 | 20 | 1.5 | 60 | 0 | |
| 135 | 0.2 | 8 | 0.8 | 32 | 1.5 | 60 | 1 | |
| 136 | 0.1 | 4 | 0.9 | 36 | 1.5 | 60 | 3 | C |
| 137 | 0.0 | 0 | 1.0 | 40 | 1.5 | 60 | 3 | C |
| 138 | 0.0 | 0 | 1.0 | 40 | 1.5 | 60 | 3 | C |
| 139 | 0.3 | 13 | 0.7 | 31 | 1.25 | 56 | 3 | C |
| 140 | 0.7 | 31 | 0.3 | 13 | 1.25 | 56 | 0 | |
| 141 | 0.0 | 0 | 1.0 | 44 | 1.25 | 56 | 1 | |
| 142 | 0.4 | 18 | 0.6 | 27 | 1.25 | 56 | 1 | |
| 143 | 0.5 | 25 | 0.5 | 25 | 1.0 | 50 | 0 | |
| 144 | 0.6 | 30 | 0.4 | 20 | 1.0 | 50 | 0 | |
| 145 | 0.5 | 25 | 0.5 | 25 | 1.0 | 50 | 0 | |
| 146 | 0.2 | 10 | 0.8 | 40 | 1.0 | 50 | 3 | C |
| 147 | 0.1 | 5 | 0.9 | 45 | 1.0 | 50 | 1 | |
| 148 | 0.0 | 0 | 1.0 | 50 | 1.0 | 50 | 1 | |
| 149 | 0.0 | 0 | 1.0 | 57 | 0.75 | 43 | 0 | |
| 150 | 0.2 | 11 | 0.8 | 46 | 0.75 | 43 | 3 | C |
| 151 | 0.4 | 23 | 0.6 | 34 | 0.75 | 43 | 3 | C |
| 152 | 0.5 | 28.5 | 0.5 | 28.5 | 0.75 | 43 | 1 | |
| 153 | 0.8 | 46 | 0.2 | 11 | 0.75 | 43 | 0 | |
| 154 | 0.666 | 38 | 0.333 | 19 | 0.75 | 43 | 0 | |
| 155 | 0.5 | 30 | 0.5 | 30 | 0.667 | 40 | 0 | |
| 156 | 0.383 | 23 | 0.617 | 37 | 0.667 | 40 | 0 | |
| 157 | 0.6 | 37 | 0.4 | 25 | 0.6 | 38 | 0 | |
| 158 | 0.4616 | 30 | 0.5384 | 35 | 0.538 | 35 | 0 | |
| 159 | 0.54 | 35 | 0.46 | 30 | 0.54 | 35 | 1 | A |
| 160 | 0.446 | 29 | 0.554 | 36 | 0.538 | 35 | 0 | |
| 161 | 0.0 | 0 | 1.0 | 67 | 0.5 | 33 | 0 | |
| 162 | 0.6 | 40 | 0.4 | 27 | 0.5 | 33 | 0 | A |
| 163 | 0.6 | 40 | 0.4 | 27 | 0.5 | 33 | 0 | A |
| 164 | 0.6 | 40 | 0.4 | 27 | 0.5 | 33 | 0 | |
| 165 | 0.45 | 30 | 0.55 | 37 | 0.5 | 33 | 2 | |
| 166 | 0.45 | 30 | 0.55 | 37 | 0.5 | 33 | 1 | |
| 167 | 0.45 | 30 | 0.55 | 37 | 0.5 | 33 | 2 | |
| 168 | 0.45 | 30 | 0.55 | 37 | 0.5 | 33 | 2-L | |
| 169 | 0.45 | 30 | 0.55 | 37 | 0.5 | 33 | 1 | |
| 170 | 0.45 | 30 | 0.55 | 37 | 0.5 | 33 | 1 | |
| 171 | 0.45 | 30 | 0.55 | 37 | 0.5 | 33 | 2-L | |
| 172 | 0.45 | 30 | 0.55 | 37 | 0.5 | 33 | 2 | |
| 173 | 0.3 | 20 | 0.7 | 47 | 0.5 | 33 | 3 | C |
| 174 | 0.5 | 35 | 0.5 | 35 | 0.4285 | 30 | 0 | A |
| 175 | 0.5 | 35 | 0.5 | 35 | 0.4285 | 30 | 2 | |
| 176 | 0.4142 | 29 | 0.5858 | 41 | 0.4285 | 30 | 2-L | |
| 177 | 0.533 | 40 | 0.467 | 35 | 0.33 | 25 | 2 | A |
| 178 | 0.47 | 36 | 0.53 | 41 | 0.3 | 23 | 1-2 | |
| 179 | 0.44 | 34 | 0.56 | 43 | 0.29 | 23 | 3-L | C |
| 180 | 0.44 | 34 | 0.56 | 43 | 0.29 | 23 | 2 | |
| 181 | 0.44 | 34 | 0.56 | 43 | 0.29 | 23 | 3-L | C |
| 182 | 0.44 | 34 | 0.56 | 43 | 0.29 | 23 | 3 | C |
| 183 | 0.44 | 34 | 0.56 | 43 | 0.29 | 23 | 2 | A |
| 184 | 0.4 | 31 | 0.6 | 47 | 0.29 | 22 | 2 | |
| 185 | 0.6 | 48 | 0.4 | 32 | 0.25 | 20 | 1 | A |
| 186 | 0.5 | 40 | 0.5 | 40 | 0.25 | 20 | 2 | A |
| 187 | 0.0 | 0 | 1.0 | 80 | 0.25 | 20 | 2-A | |
| 188 | 0.45 | 36 | 0.55 | 44 | 0.25 | 20 | 3 | C |
| 189 | 0.3 | 24 | 0.7 | 56 | 0.25 | 20 | 1 | |
| 190 | 0.4 | 33 | 0.6 | 49 | 0.22 | 18 | 2 | |
| 191 | 0.5 | 42 | 0.5 | 42 | 0.2 | 16 | 1 | |
| 192 | 0.56 | 48 | 0.44 | 37 | 0.176 | 15 | 1 | |
| 193 | 0.45 | 38 | 0.55 | 47 | 0.176 | 15 | 2 | |
| 194 | 0.61 | 52 | 0.39 | 33 | 0.18 | 15 | 1 | |
| 195 | 0.4118 | 35 | 0.5882 | 50 | 0.175 | 15 | 3 | C |
| 196 | 0.4118 | 35 | 0.5882 | 50 | 0.175 | 15 | 1 | |
| 197 | 0.4118 | 35 | 0.5882 | 50 | 0.175 | 15 | 1 | |
| 198 | 0.42 | 38 | 0.58 | 52 | 0.11 | 10 | 2 | |
| 199 | 0.55 | 50 | 0.45 | 50 | 0.11 | 10 | 1 | |
| 200 | 0.48 | 43 | 0.52 | 47 | 0.11 | 10 | 1 | |
| 201 | 0.0 | 0 | 1.0 | 90 | 9.1 | 10 | 1 | |
| 202 | 0.7 | 64 | 0.3 | 27 | 0.1 | 9 | 0 | |
| 203 | 0.5 | 45.5 | 0.5 | 45.5 | 0.1 | 9 | 3 | C |
| 204 | 0.3 | 27 | 0.7 | 64 | 0.1 | 9 | 1 | |
| 205 | 0.45 | 36 | 0.55 | 44 | 0.25 | 20 | 2 | |
| 206 | 0.5 | 42 | 0.5 | 42 | 0.2 | 16 | 2 | |
| 207 | 0.42 | 34 | 0.58 | 46 | 0.25 | 20 | 2 | |
| 208 | 0.470 | 36 | 0.530 | 41 | 0.30 | 23 | 2 | C |

TABLE VII

BLENDS OF POLYESTERS (a) and (b)

| Test No. | Polyester (weight %) (a) P-1 | (b) B-1 | (b) B-2 | % wt. of Glass Fiber |
|---|---|---|---|---|
| 1 | 100.0 | — | — | — |
| 2 | 70.0 | — | — | 30⁽¹⁾ |
| 3 | 63.0 | 7.0 | — | 30⁽¹⁾ |
| 4 | 55.0 | 15.0 | — | 30⁽¹⁾ |
| 5 | 42.0 | 28.0 | — | 30⁽¹⁾ |
| 6 | 0.0 | 70.0 | — | 30⁽²⁾ |
| 7 | 100.0 | — | 0.0 | — |
| 8 | 90.0 | — | 10.0 | — |
| 9 | 78.6 | — | 21.4 | — |
| 10 | 50.0 | — | 50.0 | — |
| 11 | 21.4 | — | 78.6 | — |
| 12 | 10.0 | — | 90.0 | — |
| 13 | 0.0 | — | 100.0 | — |
| 14 | 70.0 | — | 0.0 | 30⁽¹⁾ |
| 15 | 63.0 | — | 7.0 | 30⁽¹⁾ |

TABLE VII-continued

BLENDS OF POLYESTERS (a) and (b)

| Test No. | Polyester (weight %) (a) P-1 | (b) B-1 | (b) B-2 | % wt. of Glass Fiber |
|---|---|---|---|---|
| 16 | 55.0 | — | 15.0 | 30[1] |
| 17 | 35.0 | — | 35.0 | 30[1] |
| 18 | 15.0 | — | 55.0 | 30[1] |
| 19 | 7.0 | — | 63.0 | 30[1] |
| 20 | 0.0 | — | 70.0 | 30[1] |

[1]Henry and Frick (now Fibertec) untreated 3016 (1/16") milled glass fiber.
[2]Based on OC497 glass roving (Owens-Corning).

TABLE VIII

PROPERTIES OF POLYESTER BLENDS OF TABLE VII

| Test No. | Injection Molding Stock Temp (°C.) | HDT (°C.) | Blister Rating[1] | Flexural Strength (psi) | Flexural Modulus (DMA) (psi × 10$^6$) at 20° C. | 200° C. | 250° C. | 300° C. |
|---|---|---|---|---|---|---|---|---|
| 1 | 446 | 250 | 15.0 | 18,500 | 2.03 | 0.83 | 0.57 | 0.36 |
| 2 | 433 | 264 | 13.9 | 13,380 | 2.25 | 0.83 | 0.52 | 0.31 |
| 3 | 420 | 267 | 8.2 | 25,800 | 2.65 | 0.97 | 0.62 | 0.35 |
| 4 | 390 | 261 | 0.07 | 28,480 | 2.39[2] | 0.85 | 0.54 | 0.29 |
| 5 | 379 | 224 | 0.0 | 17,680 | 2.02 | 0.53 | 0.29 | 0.10 |
| 6 | 358 | 272 | 0.0 | 24,070 | 1.97 | 0.95 | 0.78 | 0.42 |

[1]Blister rating: 0 = best; 16 = worst.
[2]Value at 30° C.

TABLE IX

PROPERTIES OF POLYESTER BLENDS OF TABLE VII

| Test No. | Tensile Strength (psi) | Modulus (psi × 10$^6$) | Elong. (%) | Flexural Strength (psi) | Modulus (psi × 10$^6$) | HDT (°C.) | Blister Rating[1] | DMA (psi × 10$^6$) at (°C.) 30 | 50 | 100 | 150 | 200 | 250 | 300 |
|---|---|---|---|---|---|---|---|---|---|---|---|---|---|---|
| Neat |
| 7 | 8,900 | 1.18 | 0.80 | 14,400 | 1.35 | 248.8 | 11.3 | 1.61 | 1.52 | 1.29 | 1.11 | 0.72 | 0.47 | 0.28 |
| 8 | 12,310 | 2.27 | 0.76 | 18,400 | 1.64 | 252.6 | 1.2 | 1.80 | 1.71 | 1.41 | 1.08 | 0.73 | 0.48 | 0.23 |
| 9 | 19,942 | 3.46 | 0.86 | 22700 | 1.99 | 264.0 | 0.28 | 2.13 | 2.02 | 1.60 | 1.22 | 0.88 | 0.58 | 0.27 |
| 10 | 21,386 | 4.50 | 1.10 | 23,200 | 1.65 | 256.9 | 0.0 | 1.56 | 1.49 | 1.15 | 0.77 | 0.55 | 0.36 | 0.14 |
| 11 | 21,116 | 4.54 | 1.00 | 22,000 | 1.62 | 266.3 | 0.0 | 1.45 | 1.37 | 1.04 | 0.75 | 0.61 | 0.47 | 0.26 |
| 12 | 14,200 | 3.81 | 0.72 | 22,100 | 1.92 | 299.7 | 0.0 | 1.46 | 1.38 | 1.06 | 0.85 | 0.76 | 0.63 | 0.45 |
| 13 | 17,550 | 4.31 | 0.62 | 22,200 | 2.42 | 346.2 | 2.1 | 2.60 | 2.48 | 1.94 | 1.67 | 1.57 | 1.42 | 1.19 |
| 30% Glass Filled |
| 14 | 7,880 | 1.50 | 0.6 | 13,400 | 1.65 | 259.5 | 9.2 | 1.61 | 1.52 | 1.29 | 1.11 | 0.72 | 0.47 | 0.28 |
| 15 | 13,221 | 2.61 | 0.9 | 19,100 | 1.99 | 271.5 | 1.6 | 2.34 | 2.25 | 1.89 | 1.46 | 0.98 | 0.66 | 0.35 |
| 16 | 17,264 | 2.66 | 1.0 | 23,000 | 2.17 | 272.4 | 0.07 | 2.52 | 2.40 | 1.99 | 1.58 | 1.10 | 0.75 | 0.38 |
| 17 | 19,667 | 2.40 | 2.0 | 24,800 | 1.83 | 256.7 | 0.13 | 1.94 | 1.86 | 1.51 | 1.10 | 0.82 | 0.59 | 0.25 |
| 18 | 18,117 | 2.26 | 2.0 | 22,500 | 1.75 | 284.2 | 0.66 | 1.84 | 1.73 | 1.35 | 1.05 | 0.90 | 0.73 | 0.47 |
| 19 | 17,760 | 2.91 | 1.7 | 23,800 | 1.91 | 310.0 | 0.07 | 1.99 | 1.89 | 1.51 | 1.22 | 1.09 | 0.94 | 0.70 |
| 20 | 19,400 | 2.65 | 1.3 | 21,700 | 2.37 | 348.4 | 0.26 | 2.81 | 2.66 | 2.08 | 1.79 | 1.71 | 1.58 | 1.34 |

[1]Blister rating: 0 = best; 16 = worst.

TABLE X

ROOM TEMPERATURE IZOD DATA OF BLENDS OF POLYESTERS OF TABLE VII

| Test No. | Notched (ft-lb/in.) | Unnotched (ft-lb/in.) |
|---|---|---|
| 14 | 0.70 | 2.00 |
| 15 | 0.90 | 2.70 |
| 16 | 1.22 | 5.61 |
| 17 | 2.30 | 12.80 |
| 18 | 2.50 | 15.30 |
| 19 | 2.40 | 17.50 |
| 20 | 2.30 | 8.70 |

TABLE XI

BLENDS OF POLYESTERS

Polyester (Weight %)

| Test No. | (a) P-1 | (b) B-1 | (b) B-2 | (b) B-3 | Glass Fiber[1] | Melt Temp. (°C.) |
|---|---|---|---|---|---|---|
| 21 | 100.0 (control) | — | — | — | — | 383 |
| 22 | 78.6 | — | — | 21.4 | — | 373 |
| 23 | 20.0 | — | — | 80.0 | — | 321 |
| 24 | (control) | — | — | 100.0 | — | 286 |

[1]Henry and Frick, 1/16" milled glass fiber.

TABLE XII

PROPERTIES OF BLENDS OF TABLE XI

| Test No. | Tensile Strength (psi) | Modulus (psi 10$^6$) | Elong (%) | Flexural Strength (psi) | Modulus (psi 10$^6$) | HDT (°C.) | Blister Rating | DMA modulus (psi × 10$^6$) at: 30° C. | 50° C. | 100° C. | 150° C. | 200° C. | 250° C. | 300° C. |
|---|---|---|---|---|---|---|---|---|---|---|---|---|---|---|
| Neat |
| 21 | 8,900 | 1.18 | 0.8 | 14,400 | 1.35 | 248.8 | 15.0 | 1.32 | 1.24 | 1.01 | 0.81 | 0.51 | 0.35 | 0.20 |
| 22 | 11,300 | 1.55 | 0.7 | 18,800 | 1.49 | 236.1 | 6.0 | 1.76 | 1.64 | 1.27 | 0.84 | 0.53 | 0.31 | 0.18 |
| 23 | 19,800 | 2.02 | 1.6 | — | — | 176.7 | 16.0 | 1.52 | 1.39 | 0.90 | 0.33 | 0.16 | 0.03 | — |
| 24 | 18,200 | 1.40 | 3.3 | 20,400 | 1.20 | 189.4 | 16.0 | 1.32 | 1.90 | 0.69 | 0.30 | 0.20 | 0.06 | — |

We claim:

1. A fully aromatic polyester blend comprising 1 to 19 parts by weight of a polyester (a) comprising the following recurring moieties:

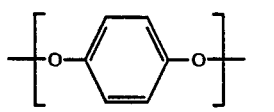 (I)

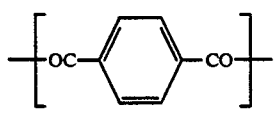 (II)

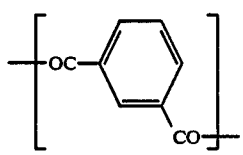 (III)

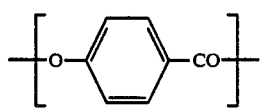 (IV)

wherein the sum of the number of units (II) and (III) is approximately equal to the number of unit (I); and unit (IV) ranges from about 0.18 to about 9.0 moles per each mole of unit (I); and which has a melting point in the range of from about 340° to about 400° C., a crystallization temperature of from about 300° to about 340° C., and a crystallization rate of at least 1,000 counts/minute; to one part by weight of a polyester (b) comprising recurring moieties:

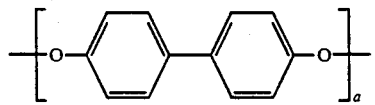 (V)

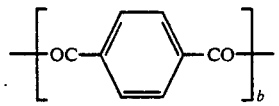 (VI)

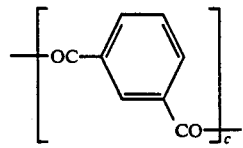 (VII)

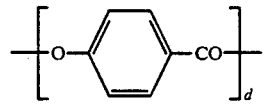 (VIII)

wherein the sum of the number of units (VI) and (VII) is approximately equal to the number of unit (V); and unit (VIII) ranges from about 1 to about 7 moles per each mole of unit (V); and said blend, when filled with 30 weight percent glass fibers has an heat distortion temperature of at least 240° C. when measured under a load of 264 psi.

2. A blend comprising from about 1 to about 19 parts by weight of a first polyester polymer (a) comprising units (I), (II), (III) and (IV):

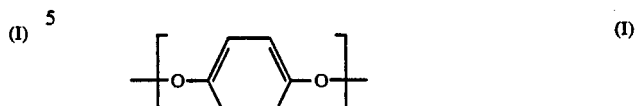 (I)

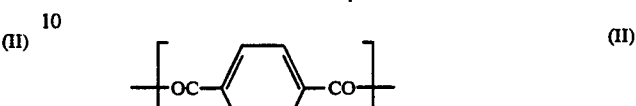 (II)

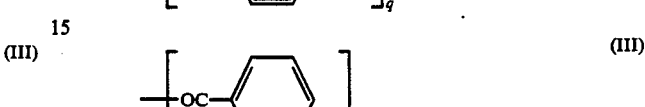 (III)

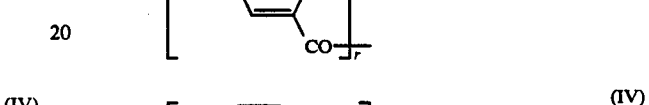 (IV)

where (I) is approximately equal to (II)+(III); q is in the range of from about 0.05 to about 0.76; r is in the range of from about 0.95 to about 0.24; s is in the range of from about 0.10 to about 9.0 moles per each mole of unit (I); per one part by weight of a second polyester polymer (b) comprising unit (IX), (X) and (XI):

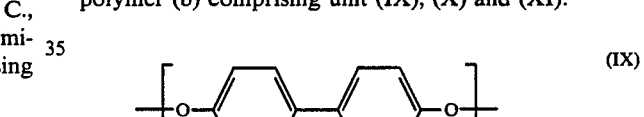 (IX)

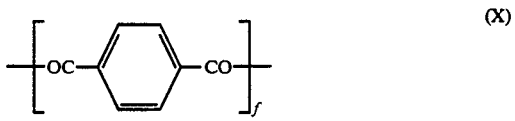 (X)

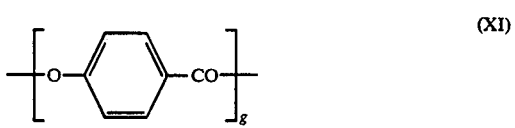 (XI)

wherein e is approximately equal to f; e is 1; and g is in the range of from about 1.5 to about 5 moles per each mole of unit (IX).

3. A blend consisting essentially of about 1 to about 95 parts by weight of a first polyester (a) comprising units (I), (II), (III) and (IV):

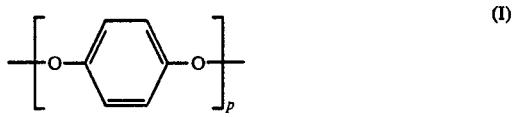 (I)

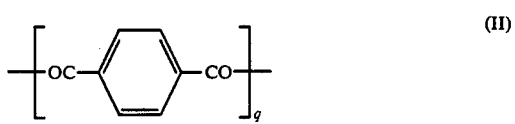 (II)

-continued

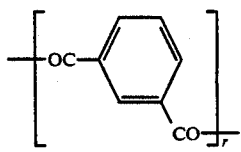   (III)

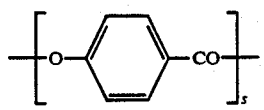   (IV)

where (I) is approximately equal to (II)+(III); q is in the range of from about 0.05 to about 0.76; r is in the range of from about 0.95 to about 0.24; s is in the range of from about 0.10 to about 9.0 moles per each mole of unit (I); per one part by weight of a second polyester (b) comprising units (IX), (X) and (XI);

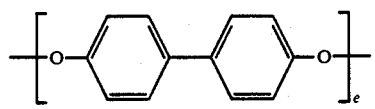   (IX)

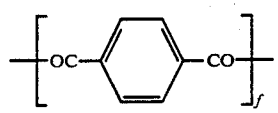   (X)

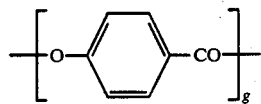   (XI)

wherein e is approximately equal to f, e is 1 mole; g is in the range of from about 1.5 moles to about 5 moles per each mole of e.

4. A blend as defined in claim 2 having a heat distortion temperature of at least about 200° C. when measured under a load of 264 psi, and which yields fabricated articles having good surface characteristics.

5. A blend as defined in claim 2 wherein the component first and second polyesters are each prepared by reacting the aromatic dicarboxylic acid(s), the p-hydroxybenzoic acid, and the aromatic diol with an anhydride of a lower monocarboxylic acid to yield a prepolymer, followed by a solid state advancement of said prepolymer to a desired final molecular weight.

6. A blend as defined in claim 2 wherein s is about 0.25 mole to about 0.55 mole per each mole of unit (I); q is about 0.50 mole to about 0.70 mole; and r is about 0.30 mole to about 0.50 mole.

7. A blend as defined in claim 2 wherein s is about 0.55 mole to about 9.0 moles per each mole of unit (I); q is about 0.05 to about 0.80 mole; and r is about 0.95 mole to about 0.20 mole.

8. A blend as defined in claim 2 wherein when e is one mole g is in the range of from about 2 to about 4 moles.

9. A blend as defined in claim 2 wherein when unit (I) is one mole s is about 0.25 mole to about 0.55 mole per each mole of unit (I); q is about 0.50 mole to about 0.70 mole; r is about 0.30 mole to about 0.50 mole; e is 1 mole; and g is in the range of from about 2 to about 4 moles.

10. A blend as defined in claim 2 wherein when unit (I) is 1 mole s is about 0.55 mole to about 9.0 mole per each mole of unit (I); q is about 0.050 to about 0.80 mole; r is about 0.95 mole to about 0.20 mole; e is one mole; and g is in the range of from about 2 to about 4 moles.

11. A blend comprising from about 1 to about 19 parts by weight of a first polyester polymer comprising units (IX), (X), (XI), (XII):

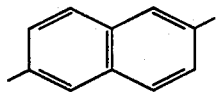   (IX)

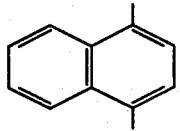   (X)

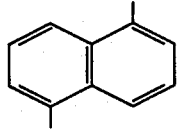   (XI)

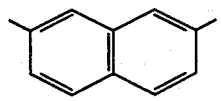   (XII)

where n is 1 and 2; the number of moles of units (IX) is approximately equal to the number of moles of units (X)+(XI); to one part by weight of a second polyester polymer comprising at least one unit:

$$-X_1\text{-Ar-}X_2-$$   (XIII)

wherein Ar comprises at least one member selected from the group consisting of:

(XIV)

(XV)

(XVI)

and (XVII)

$X_1$ and $X_2$ are independently selected from the group consisting of oxy and carbonyl.

12. The blend of claim 11 wherein the Ar group of the second polyester also comprises a divalent aromatic radical comprising at least one phenylene group.

13. A blend consisting essentially of from about 1 to 19 parts by weight of a first polyester comprising units (IX), (X), (XI), (XII):

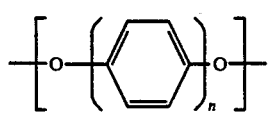 (IX)

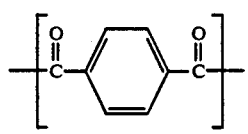 (X)

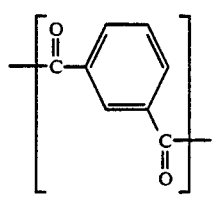 (XI)

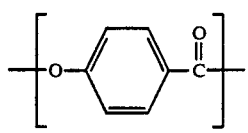 (XII)

where n is 1 and 2; the number of moles of units (IX) is approximately equal to the number of mole of units (X) and (XI); to one part by weight of a second polyester comprising at least one unit:

—$X_1$-Ar-$X_2$— (XIII)

wherein Ar comprises at least one member selected from the group consisting of:

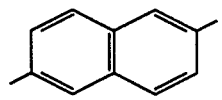 (XIV)

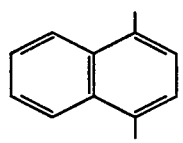 (XV)

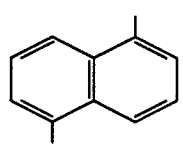 (XVI)

and

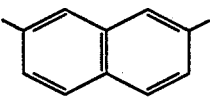 (XVII)

$X_1$ and $X_2$ are independently selected from the group consisting of oxy and carbonyl.

14. The blend of claim 13 wherein the Ar group of the second polyester also comprises a divalent aromatic radical comprising at least one phenylene group.

15. A blend as defined in claim 11 comprising from about 1 to 19 parts by weight of a first polyester comprising units (IX), (X), (XI), (XII):

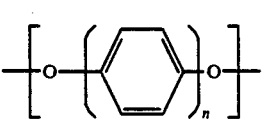 (IX)

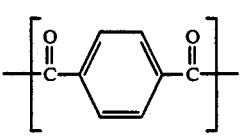 (X)

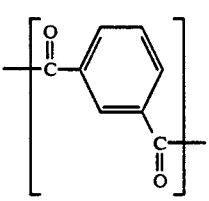 (XI)

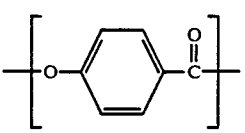 (XII)

where n is 1; (IX) is approximately equal to (X)+(XI); (X) is in the range of from about 0.05 to about 0.76; (XI) is in the range of from about 0.95 to about 0.24; (XII) is in the range of from about 0.10 to about 9.0 moles per each mole of unit (IX); to one part by weight of a second polyester comprising at least one unit:

—$X_1$-Ar-$X_2$— (XIII)

wherein Ar, $X_1$ and $X_2$ are as previously defined in claims 11 and 12.

16. The blend of claim 15 wherein the Ar group of the second polyester also comprises a divalent aromatic radical comprising at least one phenylene group.

17. A blend as defined in claim 11 consisting essentially of from about 5 to about 95 parts by weight of a first polyester comprising units (IX), (X), (XI), (XII):

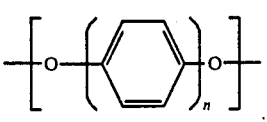 (IX)

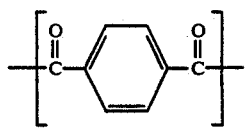

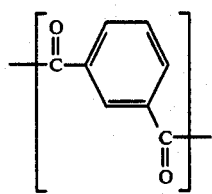

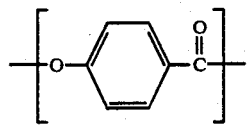

where n is 1; (IX) is approximately equal to (X)+(XI); (X) is in the range of from about 0.05 to about 0.76; (XI) is in the range of from about 0.95 to about 0.24; (XII) is in the range of from about 0.10 to about 9.0 moles per each mole of unit (IX); and from about 95 to about 5 parts by weight of a second polyester comprising at least one unit:

—X$_1$-Ar-X$_2$— (XIII)

wherein Ar, X$_1$ and X$_2$ are as previously defined in claims 11 and 12.

18. The blend of claim 17 wherein the Ar group of the second polyester also comprises a divalent aromatic radical comprising at least one phenylene group.

19. A blend as defined in claim 11 comprising from about 5 to about 95 parts by weight of a first polyester comprising units (IXb), (IXc), (Xa), (XIa), (XIIa):

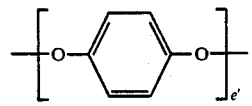

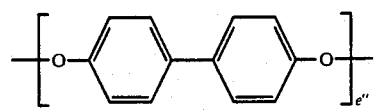

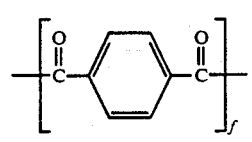

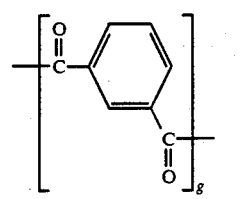

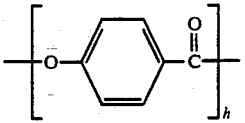

wherein e′+e″ is approximately equal to f+g; the ratio of e′ to e″ is from about 3:1 to about 99:1; the ratio of f to g is from about 0.42:1 to about 10:1; and the ratio of h to f+g is in the range of from about 0.15:1 to about 8.0:1 moles per one mole of monomers corresponding to the sum of units (IXb)+(IXc); and from about 95 to about 5 parts by weight of a second polyester comprising at least one unit:

—X$_1$-Ar-X$_2$— (XIII)

wherein Ar, X$_1$ and X$_2$ are as previously defined in claims 11 and 12.

20. The blend of claim 19 wherein the Ar group of the second polyester also comprises a divalent aromatic radical comprising at least one phenylene group.

21. A blend as defined in claim 11 consisting essentially of from about 5 to about 95 parts by weight of a first polyester comprising units (IXb), (IXc), (Xa), (XIa), (XIIa):

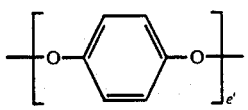

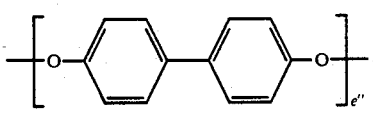

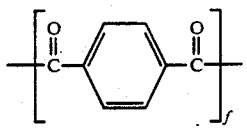

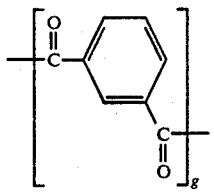

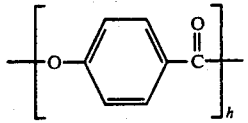

wherein e′+e″ is approximately equal to f+g; the ratio of e′ to e″ is from about 3:1 to about 99:1; the ratio of f to g is from about 0.42:1 to about 10:1; and the ratio of h to f+g is in the range of from about 0.15:1 to about 8.0:1 moles and from about 95 to about 5 parts by weight of a second polyester comprising at least one unit:

—X$_1$-Ar-X$_2$— (XIII)

wherein Ar, $X_1$ and $X_2$ are as previously defined in claims 11 and 12.

22. The blend of claim 21 wherein the Ar group of the second polyester also comprises a divalent aromatic radical comprising at least one phenylene group.

23. A blend as defined in claim 11 having heat distortion temperature of at least 175° C. when measured under a load of 264 psi.

24. A blend as defined in claim 11 having heat distortion temperature of at least 200° C. when measured under a load of 264 psi.

25. A blend as defined in claim 11 wherein the first polyester is comprised of units (IX), (X), (XI), (XII):

(IX)

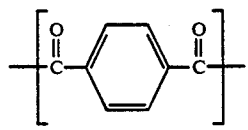
(X)

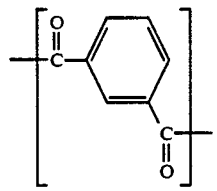
(XI)

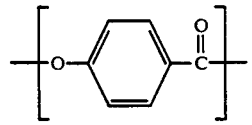
(XII)

where n is 1; (IX) is approximately equal to (X)+(XI) is from about 0.50 to about 0.70; (XI) is from about 0.30 to about 0.50; and (XII) is from about 0.25 to about 0.55 mole per each mole of unit (IX).

26. A blend as defined in claim 11 wherein the first polyester is comprised of units (IX), (X), (XI), (XII):

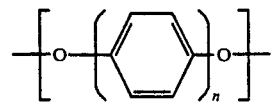
(IX)

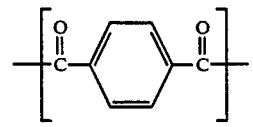
(X)

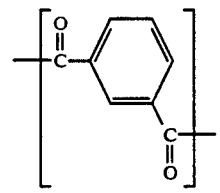
(XI)

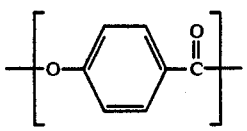
(XII)

where n is 1; (IX) is approximately equal to (X)+(XI); (X) is from about 0.05 to about 0.80; (XI) is from about 0.20 to about 0.95; and (XII) is from about 0.55 to about 9.0 moles per each mole of unit (IX).

27. A blend as defined in claim 11 wherein the first polyester is comprised of units (IXb), (IXc), (Xa), (XIa), (XIIa):

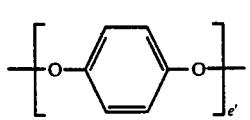
(IXb)

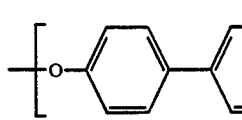
(IXc)

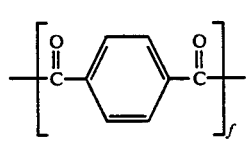
(Xa)

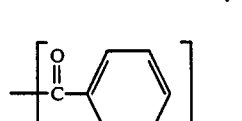
(XIa)

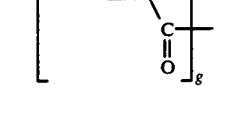
(XIIa)

wherein e'+e" is approximately equal to f+g; the ratio of e' to e" is from about 3.0:1 to about 99.1; the ratio of f to g is from about 0.42:1 to about 10:1; and the ratio of h to f+g is from about 0.15:1 to about 8.0:1 moles.

28. A blend as defined in claim 11 wherein the second polyester consists essentially of the recurring units (XIX) and (XX) which may be substituted by one or more $C_1$ to $C_4$ alkyl groups, $C_1$ to $C_4$ alkoxy groups or halogen atoms; and wherein said second polyester comprises from about 10 to about 90 mole percent of units (XIX) and from about 90 to about 10 mole percent of units (XX)

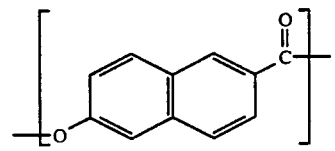
(XIX)

-continued

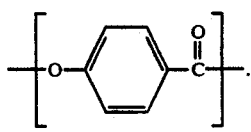 (XX)

29. A blend as defined in claim 11 wherein the second polyester consists essentially of the recurring units (XX), (XXI), (XXII):

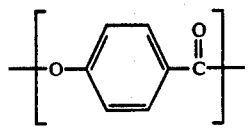 (XX)

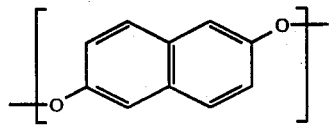 (XXI)

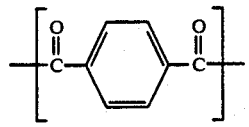 (XXII)

and wherein said second polyester comprises from about 40 to about 60 mole percent of units (XX); from about 20 to about 30 mole percent of units (XXI); and from about 20 to about 30 mole percent of units (XXII).

30. A blend as described in claim 29 wherein the second polyester consists essentially of the recurring units (XIX), (XXIII), (XXIV):

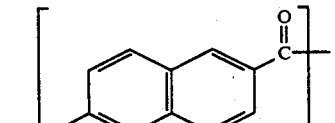 (XIX)

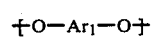 (XXIII)

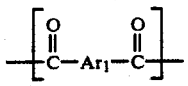 (XXIV)

which may be substituted by one or more $C_1$ to $C_4$ alkyl groups, $C_1$ to $C_4$ alkoxy groups, halogen atoms, or phenyl groups; wherein the group $Ar_1$ is as previously defined in claims 11 and 12; and wherein said second polyester comprises from about 10 to about 90 mole percent of units (XIX); from about 5 to about 45 mole percent of units (XXIII); and from about 5 to about 45 mole percent of units (XXIV).

31. A molding compound comprising the blends of claim 2 and from about 1 to about 50 percent by weight, based upon the total weight of the molding compound, of at least one material selected from the group consisting of glass fibers, asbestos, graphitic carbon fibers, amorphous carbon fibers, synthetic polymeric fibers, aluminum, fibers, aluminum silicate fibers, oxide of aluminum fibers, titanium fibers, magnesium fibers, rock wool fibers, steel fibers, tungsten fibers, cotton, wool, and wood cellulose fibers, calcium silicate, silica, clays, talc, mica, carbon black, titanium dioxide, wollastonite, polytetrafluoroethylene, graphite, alumina trihydrate, sodium aluminum carbonate, barium ferrite, and glass beads.

32. A molding compound comprising the blends of claim 2 and from about 1 to about 50 percent by weight, based upon the total weight of the molding compound, of at least one material selected from the group consisting of glass fibers, asbestos, graphicit carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wood cellulose fibers, calcium silicate, silica, clays, talc, mica, carbon black, titanium dioxide, woolastonite, polytetrafluoroethylene, graphite, alumina trihydrate, sodium aluminum carbonate, barium ferrite, and glass beads.

33. An ovenware article comprising the molding compound of claim 31.

34. An ovenware article comprising the molding compound of claim 32.

* * * * *

UNITED STATES PATENT AND TRADEMARK OFFICE
CERTIFICATE OF CORRECTION

PATENT NO. : 5,296,542

DATED : March 22, 1994

Page 1 of 2

INVENTOR(S) : Richard Layton, James W. Cleary, Paul J. Huspeni
Paul D. Frayer, Markus Matzner It is certified that error appears in the above-indentified patent and that said Letters Patent is hereby corrected as shown below:

| Col. | Line | |
|------|------|---|
| 1 | 64 | "have been described in the part" should read --have been described in the past-- |
| 1 | 66 | "frequency exhibit" should read --frequently exhibit-- |
| 26 | 18 | "p-hydroxylbenzoic acid;" should read --p-hydroxybenzoic acid;-- |
| 30 | 3 | "there is less change of decomposition" should read --there is less chance of decomposition-- |
| 36 | 38 | in Table V, patent reads "0.175" should read --0.176-- |
| 36 | 39 | in Table V, patent reads "0.175" should read --0.176-- |
| 36 | 40 | in Table V, patent read "0.175" should read --0.176-- |
| 36 | 43 | in Table V, patent read "9.1" should read --0.1-- |

UNITED STATES PATENT AND TRADEMARK OFFICE
CERTIFICATE OF CORRECTION

PATENT NO. : 5,296,542
DATED : March 22, 1994
INVENTOR(S) : Richard Layton, James W. Cleary, Paul J. Huspeni, Paul D. Fraye, Markus Matzner It is certified that error appears in the above-indentified patent and that said Letters Patent is hereby corrected as shown below:

| Col. | Line | |
|------|------|---|
| 43 | 38 | "where n is 1 and 2" should read --where n is 1 or 1 and 2-- |
| 47 | 42 | "(IX) is approximately equal to (X) + (XI) is" should read --(IX) is approximately equal to (X) + (XI); (X) is-- |

Signed and Sealed this

Sixteenth Day of August, 1994

Attest:

BRUCE LEHMAN

Attesting Officer

Commissioner of Patents and Trademarks